US009167276B2

(12) United States Patent
Sinha et al.

(10) Patent No.: US 9,167,276 B2
(45) Date of Patent: Oct. 20, 2015

(54) METHOD AND SYSTEM FOR PROVIDING AND HANDLING PRODUCT AND SERVICE DISCOUNTS, AND LOCATION BASED SERVICES (LBS) IN AN AUTOMATIC CONTENT RECOGNITION BASED SYSTEM

(71) Applicant: Turner Broadcasting System, Inc., Atlanta, GA (US)

(72) Inventors: Nishith Kumar Sinha, Mableton, GA (US); Matthew Paul Giles, Marietta, GA (US); Donald Jude Loheide, Mableton, GA (US); Brainerd Sathianathan, Morgan Hill, CA (US); Balaji Gopinath, San Rafael, CA (US); Karl-Christian Wolff-Ingham, Decatur, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 0 days.

(21) Appl. No.: 14/142,022

(22) Filed: Dec. 27, 2013

(65) Prior Publication Data

US 2014/0282723 A1    Sep. 18, 2014

Related U.S. Application Data

(60) Provisional application No. 61/798,439, filed on Mar. 15, 2013.

(51) Int. Cl.
*G06F 3/00* (2006.01)
*G06F 13/00* (2006.01)
(Continued)

(52) U.S. Cl.
CPC .............. *H04N 21/23* (2013.01); *H04H 20/93* (2013.01); *H04H 60/37* (2013.01); *H04H 60/40* (2013.01);
(Continued)

(58) Field of Classification Search
CPC .................... H04N 21/4126; H04N 21/41407; H04N 21/23; H04N 21/4122; H04N 21/84
USPC .................................. 725/32–36, 40, 80, 141
See application file for complete search history.

(56) References Cited

U.S. PATENT DOCUMENTS 5,305,464 A   4/1994   Frett
5,410,326 A   4/1995   Goldstein
(Continued)

FOREIGN PATENT DOCUMENTS

WO   WO 95/17746 A1   6/1995
WO   WO 02/37316 A2   5/2002
WO   WO 03/067459 A2   8/2003

*Primary Examiner* — Benjamin R Bruckart
*Assistant Examiner* — Akshay Doshi
(74) *Attorney, Agent, or Firm* — Hopeton S. Walker; Loza & Loza, LLP

(57) ABSTRACT

An automatic content recognition (ACR) enabled display communication device may present a linear advertisement campaign. A second screen communication device (SSCD) that is paired with an ACR-enabled display communication device, may detect when content associated with a linear advertisement campaign is available for display on the SSCD. A location of the SSCD may be determined when the SSCD detects that the content associated with the linear advertisement campaign is available for display. The SSCD may customize content for presentation in order to offer one or more products and/or services to a viewer of the SSCD based on the determined location. The SSCD determines assets that are required and/or utilized for the customization of the content so that it may be presented on the SSCD. The SSCD may acquire the determined assets from one or more servers and control presentation of the content based on information corresponding to the acquired assets.

30 Claims, 6 Drawing Sheets

(51) Int. Cl.

| | |
|---|---|
| *H04N 5/445* | (2011.01) |
| *H04N 7/16* | (2011.01) |
| *H04H 60/33* | (2008.01) |
| *H04H 60/32* | (2008.01) |
| *H04N 21/23* | (2011.01) |
| *H04H 60/40* | (2008.01) |
| *H04N 21/234* | (2011.01) |
| *H04N 21/44* | (2011.01) |
| *H04N 21/61* | (2011.01) |
| *H04N 21/84* | (2011.01) |
| *H04N 21/414* | (2011.01) |
| *H04N 21/41* | (2011.01) |
| *H04N 21/643* | (2011.01) |
| *H04H 60/37* | (2008.01) |
| *H04H 20/93* | (2008.01) |
| *H04H 60/82* | (2008.01) |

(52) U.S. Cl.
CPC ............. *H04H 60/82* (2013.01); *H04N 21/234* (2013.01); *H04N 21/23418* (2013.01); *H04N 21/23424* (2013.01); *H04N 21/4122* (2013.01); *H04N 21/4126* (2013.01); *H04N 21/41407* (2013.01); *H04N 21/44008* (2013.01); *H04N 21/6125* (2013.01); *H04N 21/6175* (2013.01); *H04N 21/64322* (2013.01); *H04N 21/84* (2013.01)

(56) References Cited

U.S. PATENT DOCUMENTS

| | | | |
|---|---|---|---|
| 5,437,050 A | 7/1995 | Lamb et al. | |
| 5,712,995 A | 1/1998 | Cohn | |
| 5,874,686 A | 2/1999 | Ghias et al. | |
| 5,918,223 A | 6/1999 | Blum et al. | |
| 5,956,683 A | 9/1999 | Jacobs et al. | |
| 5,991,737 A | 11/1999 | Chen | |
| 6,121,530 A | 9/2000 | Sonoda | |
| 6,184,877 B1 | 2/2001 | Dodson et al. | |
| 6,201,176 B1 | 3/2001 | Yourlo | |
| 6,314,577 B1 | 11/2001 | Pocock | |
| 6,408,272 B1 | 6/2002 | White et al. | |
| 6,504,089 B1 | 1/2003 | Negishi et al. | |
| 6,556,218 B1 | 4/2003 | Alcorn | |
| 6,760,720 B1 | 7/2004 | De Bellis | |
| 6,765,595 B2 | 7/2004 | Lee et al. | |
| 6,834,308 B1 | 12/2004 | Ikezoye et al. | |
| 6,968,337 B2 | 11/2005 | Wold | |
| 6,990,453 B2 | 1/2006 | Wang et al. | |
| 7,080,325 B2 | 7/2006 | Treibach-Heck et al. | |
| 7,095,871 B2 | 8/2006 | Jones | |
| 7,134,132 B1 | 11/2006 | Ngo | |
| 7,174,293 B2 | 2/2007 | Kenyon et al. | |
| 7,190,971 B1 | 3/2007 | Kawamoto | |
| 7,194,752 B1 | 3/2007 | Kenyon et al. | |
| 7,266,343 B1 | 9/2007 | Yli-Juuti et al. | |
| 7,363,278 B2 | 4/2008 | Schmelzer et al. | |
| 7,444,353 B1 | 10/2008 | Chen et al. | |
| 7,500,007 B2 | 3/2009 | Ikezoye et al. | |
| 7,529,659 B2 | 5/2009 | Wold | |
| 7,562,012 B1 | 7/2009 | Wold et al. | |
| 7,562,392 B1 | 7/2009 | Rhoads et al. | |
| 7,565,327 B2 | 7/2009 | Schmelzer | |
| 7,624,416 B1 | 11/2009 | Vandermolen | |
| 7,703,114 B2 | 4/2010 | Thukral | |
| 7,707,088 B2 | 4/2010 | Schmelzer | |
| 7,711,652 B2 | 5/2010 | Schmelzer | |
| 7,730,509 B2 | 6/2010 | Boulet et al. | |
| 7,747,749 B1 | 6/2010 | Erikson et al. | |
| 7,783,489 B2 | 8/2010 | Kenyon et al. | |
| 7,797,249 B2 | 9/2010 | Schmelzer et al. | |
| 7,813,954 B1 | 10/2010 | Price | |
| 7,870,574 B2 | 1/2011 | Kenyon et al. | |
| 7,877,290 B1 | 1/2011 | Arsenault et al. | |
| 7,877,438 B2 | 1/2011 | Schrempp et al. | |
| 7,900,228 B2 | 3/2011 | Stark et al. | |
| 7,917,645 B2 | 3/2011 | Ikezoye et al. | |
| 8,006,274 B2 | 8/2011 | Scott, III | |
| 8,046,803 B1 | 10/2011 | Lee | |
| 8,117,635 B2 | 2/2012 | Hendricks et al. | |
| 8,249,422 B2 | 8/2012 | Narahara et al. | |
| 8,281,339 B1 | 10/2012 | Walker et al. | |
| 8,335,833 B1 | 12/2012 | Parkinson | |
| 8,407,750 B2 | 3/2013 | Vorbau | |
| 8,413,206 B1 | 4/2013 | Wyatt et al. | |
| 8,418,206 B2 | 4/2013 | Bryant et al. | |
| 8,553,148 B2 | 10/2013 | Ramaswamy et al. | |
| 8,572,650 B2 | 10/2013 | Townsend et al. | |
| 8,732,473 B2 | 5/2014 | Bisso et al. | |
| 8,732,739 B2 | 5/2014 | Sillerman | |
| 8,793,274 B2 | 7/2014 | Yu et al. | |
| 2002/0032906 A1 | 3/2002 | Grossman | |
| 2002/0069100 A1 | 6/2002 | Arberman | |
| 2002/0073419 A1 | 6/2002 | Yen | |
| 2002/0078441 A1 | 6/2002 | Drake | |
| 2002/0083060 A1 | 6/2002 | Wang et al. | |
| 2002/0120925 A1 | 8/2002 | Logan | |
| 2002/0133817 A1 | 9/2002 | Markel | |
| 2002/0178447 A1 | 11/2002 | Plotnick | |
| 2003/0002638 A1 | 1/2003 | Kaars | |
| 2003/0035075 A1 | 2/2003 | Butler et al. | |
| 2003/0055699 A1 | 3/2003 | O'Connor | |
| 2003/0056101 A1 | 3/2003 | Epstein | |
| 2003/0101451 A1 | 5/2003 | Bentolila | |
| 2003/0149975 A1 | 8/2003 | Eldering | |
| 2003/0154475 A1 | 8/2003 | Rodriguez | |
| 2003/0172381 A1 | 9/2003 | Janevski | |
| 2004/0003397 A1 | 1/2004 | Boston et al. | |
| 2004/0031046 A1 | 2/2004 | Weinblatt et al. | |
| 2004/0034874 A1 | 2/2004 | Hord | |
| 2004/0068737 A1 | 4/2004 | Itoh et al. | |
| 2004/0143349 A1 | 7/2004 | Roberts | |
| 2004/0143845 A1 | 7/2004 | Lin | |
| 2004/0189710 A1 | 9/2004 | Goulden et al. | |
| 2004/0205810 A1 | 10/2004 | Matheny et al. | |
| 2004/0210847 A1 | 10/2004 | Berson et al. | |
| 2004/0255322 A1 | 12/2004 | Meadows et al. | |
| 2005/0022211 A1 | 1/2005 | Veselov et al. | |
| 2005/0097599 A1 | 5/2005 | Plotnick et al. | |
| 2005/0149968 A1 | 7/2005 | Konig et al. | |
| 2005/0235307 A1 | 10/2005 | Relan | |
| 2005/0278731 A1 | 12/2005 | Cameron | |
| 2006/0015923 A1 | 1/2006 | Chuah | |
| 2006/0026636 A1 | 2/2006 | Stark et al. | |
| 2006/0031684 A1 | 2/2006 | Sharma et al. | |
| 2006/0187358 A1 | 8/2006 | Lienhart | |
| 2006/0195860 A1 | 8/2006 | Eldering | |
| 2006/0282847 A1 | 12/2006 | Gupte | |
| 2007/0192784 A1 | 8/2007 | Postrel | |
| 2007/0250901 A1 | 10/2007 | McIntire | |
| 2008/0064490 A1 | 3/2008 | Ellis | |
| 2008/0104634 A1 | 5/2008 | Gajdos et al. | |
| 2008/0127253 A1 | 5/2008 | Zhang et al. | |
| 2008/0227436 A1* | 9/2008 | Gantman et al. ........... 455/414.2 | |
| 2008/0244640 A1 | 10/2008 | Belleguie | |
| 2008/0250447 A1 | 10/2008 | Rowe et al. | |
| 2008/0305815 A1 | 12/2008 | McDonough | |
| 2008/0310731 A1 | 12/2008 | Stojancic et al. | |
| 2008/0313140 A1 | 12/2008 | Pereira et al. | |
| 2009/0009532 A1 | 1/2009 | Hallberg | |
| 2009/0064261 A1 | 3/2009 | Jung | |
| 2009/0077046 A1 | 3/2009 | Narahara et al. | |
| 2009/0077489 A1 | 3/2009 | Homma | |
| 2009/0094637 A1 | 4/2009 | Lemmons | |
| 2009/0106104 A1 | 4/2009 | Upendran et al. | |
| 2009/0119723 A1 | 5/2009 | Tinsman | |
| 2009/0133049 A1 | 5/2009 | Bradley | |
| 2009/0150930 A1 | 6/2009 | Sherwin et al. | |
| 2009/0235317 A1 | 9/2009 | Igarashi | |
| 2009/0259690 A1 | 10/2009 | Bogdanov | |
| 2009/0288113 A1 | 11/2009 | Skinner | |
| 2009/0317053 A1 | 12/2009 | Morley | |

(56) References Cited

U.S. PATENT DOCUMENTS

| | | |
|---|---|---|
| 2009/0318114 A1 | 12/2009 | Bertoni |
| 2009/0319522 A1 | 12/2009 | Karstens |
| 2009/0327894 A1 | 12/2009 | Rakib |
| 2010/0007797 A1 | 1/2010 | Stojancic |
| 2010/0043040 A1 | 2/2010 | Olsen |
| 2010/0095337 A1 | 4/2010 | Dua |
| 2010/0121691 A1 | 5/2010 | Shifflett et al. |
| 2010/0125498 A1* | 5/2010 | Jaramillo .................. 705/14.36 |
| 2010/0158391 A1 | 6/2010 | Cunningham |
| 2010/0162344 A1 | 6/2010 | Casagrande et al. |
| 2010/0169906 A1 | 7/2010 | Takahashi |
| 2010/0175078 A1 | 7/2010 | Knudson |
| 2010/0205627 A1 | 8/2010 | Cesmedziev |
| 2010/0205628 A1 | 8/2010 | Davis et al. |
| 2010/0242065 A1 | 9/2010 | Murakami |
| 2010/0245681 A1 | 9/2010 | Harris |
| 2010/0269128 A1 | 10/2010 | Gordon |
| 2010/0303338 A1 | 12/2010 | Stojancic et al. |
| 2010/0306193 A1 | 12/2010 | Pereira et al. |
| 2010/0318515 A1 | 12/2010 | Ramanathan et al. |
| 2010/0325135 A1 | 12/2010 | Chen et al. |
| 2011/0067046 A1 | 3/2011 | Cox et al. |
| 2011/0067066 A1 | 3/2011 | Barton |
| 2011/0078729 A1 | 3/2011 | Lajoie et al. |
| 2011/0078733 A1 | 3/2011 | Lee |
| 2011/0088063 A1 | 4/2011 | Ben-Romdhane et al. |
| 2011/0107363 A1 | 5/2011 | Sanghavi |
| 2011/0122255 A1 | 5/2011 | Haritaoglu |
| 2011/0177775 A1 | 7/2011 | Gupta et al. |
| 2011/0191806 A1 | 8/2011 | Knudson et al. |
| 2011/0219419 A1 | 9/2011 | Reisman |
| 2011/0280434 A1 | 11/2011 | Mamidwar et al. |
| 2011/0283322 A1 | 11/2011 | Hamano |
| 2011/0283327 A1 | 11/2011 | Zhu |
| 2011/0289098 A1 | 11/2011 | Oztaskent et al. |
| 2011/0289114 A1 | 11/2011 | Yu et al. |
| 2011/0289524 A1 | 11/2011 | Toner |
| 2011/0307931 A1 | 12/2011 | Shuster |
| 2011/0311095 A1 | 12/2011 | Archer |
| 2011/0313856 A1 | 12/2011 | Cohen et al. |
| 2011/0314491 A1 | 12/2011 | Delidais et al. |
| 2011/0314495 A1 | 12/2011 | Zenor |
| 2012/0017236 A1 | 1/2012 | Stafford et al. |
| 2012/0042334 A1 | 2/2012 | Choi |
| 2012/0054848 A1 | 3/2012 | Salowey et al. |
| 2012/0079521 A1 | 3/2012 | Garg et al. |
| 2012/0096491 A1 | 4/2012 | Shkedi |
| 2012/0117584 A1 | 5/2012 | Gordon |
| 2012/0124625 A1 | 5/2012 | Foote |
| 2012/0144416 A1 | 6/2012 | Wetzer et al. |
| 2012/0167133 A1 | 6/2012 | Carroll |
| 2012/0174157 A1 | 7/2012 | Stinson |
| 2012/0185895 A1 | 7/2012 | Wong et al. |
| 2012/0192227 A1 | 7/2012 | Fleischman |
| 2012/0215789 A1 | 8/2012 | Ramanathan |
| 2012/0246693 A1 | 9/2012 | Iqbal |
| 2012/0303442 A1 | 11/2012 | Patwa et al. |
| 2012/0311618 A1 | 12/2012 | Blaxland |
| 2012/0317240 A1 | 12/2012 | Wang |
| 2012/0331496 A1 | 12/2012 | Copertino |
| 2013/0014146 A1 | 1/2013 | Bhatia et al. |
| 2013/0019262 A1 | 1/2013 | Bhatia et al. |
| 2013/0047178 A1 | 2/2013 | Moon |
| 2013/0047180 A1 | 2/2013 | Moon et al. |
| 2013/0125163 A1 | 5/2013 | Chen et al. |
| 2013/0132999 A1 | 5/2013 | Pandey |
| 2013/0162902 A1 | 6/2013 | Musser |
| 2013/0163957 A1 | 6/2013 | Ikizyan |
| 2013/0167171 A1 | 6/2013 | Kitazato et al. |
| 2013/0174191 A1 | 7/2013 | Thompson, Jr. et al. |
| 2013/0198768 A1 | 8/2013 | Kitazato |
| 2013/0205315 A1 | 8/2013 | Sinha et al. |
| 2013/0205316 A1 | 8/2013 | Sinha et al. |
| 2013/0205318 A1 | 8/2013 | Sinha et al. |
| 2013/0205319 A1 | 8/2013 | Sinha et al. |
| 2013/0205335 A1 | 8/2013 | Sinha et al. |
| 2013/0208942 A1 | 8/2013 | Davis |
| 2013/0239163 A1 | 9/2013 | Kim et al. |
| 2013/0305335 A1 | 11/2013 | Syed et al. |
| 2013/0332951 A1 | 12/2013 | Gharaat |
| 2013/0339999 A1* | 12/2013 | SanGiovanni et al. ......... 725/34 |
| 2014/0082659 A1 | 3/2014 | Fife et al. |
| 2014/0089815 A1 | 3/2014 | Gildfind et al. |
| 2014/0150022 A1 | 5/2014 | Oh |
| 2014/0164994 A1 | 6/2014 | Myslinski |

* cited by examiner

METHOD AND SYSTEM FOR PROVIDING AND HANDLING PRODUCT AND SERVICE DISCOUNTS, AND LOCATION BASED SERVICES (LBS) IN AN AUTOMATIC CONTENT RECOGNITION BASED SYSTEM

CROSS-REFERENCE TO RELATED APPLICATIONS/INCORPORATION BY REFERENCE

This application makes reference to, claims priority to, and claims the benefit of U.S. Application Ser. No. 61/798,439, which was filed on Mar. 15, 2013.
This application also makes reference to:
U.S. application Ser. No. 13/730,352, which was filed on Dec. 28, 2012;
U.S. application Ser. No. 14/141,931, which was filed on Dec. 27, 2014;
U.S. application Ser. No. 14/141,972, which was filed on Dec. 27, 2014;
U.S. application Ser. No. 14/141,995, which was filed on Dec. 27, 2014; and
U.S. application Ser. No. 14/142,041, which was filed on Dec. 27, 2014;
U.S. application Ser. No. 13/730,352, filed Dec. 28, 2012;
U.S. application Ser. No. 13/730,459, filed Dec. 28, 2012;
U.S. application Ser. No. 13/730,495, filed Dec. 28, 2012;
U.S. application Ser. No. 13/730,530, filed Dec. 28, 2012;
U.S. application Ser. No. 13/730,754, filed Dec. 28, 2012;
U.S. application Ser. No. 13/730,559, filed Dec. 28, 2012;
U.S. application Ser. No. 13/730,579, filed Dec. 28, 2012;
U.S. application Ser. No. 13/730,593, filed Dec. 28, 2012;
U.S. application Ser. No. 13/730,759, filed Dec. 28, 2012;
U.S. application Ser. No. 13/730,627, filed Dec. 28, 2012;
U.S. application Ser. No. 13/730,644, filed Dec. 28, 2012;
U.S. application Ser. No. 13/730,656, filed Dec. 28, 2012;
U.S. application Ser. No. 13/730,670, filed Dec. 28, 2012;
U.S. application Ser. No. 13/730,691, filed Dec. 28, 2012;
U.S. application Ser. No. 13/730,702, filed Dec. 28, 2012;
U.S. application Ser. No. 13/730,718, filed Dec. 28, 2012; and
U.S. application Ser. No. 13/730,734, filed Dec. 28, 2012.
Each of the above referenced application is hereby incorporated herein by reference in its entirety.

FIELD OF THE INVENTION

Certain embodiments of the invention relate to communication systems. More specifically, certain embodiments of the invention relate to a method and system for providing and handling product and service discounts, and location based services in an automatic content recognition based system.

BACKGROUND OF THE INVENTION

A significant portion of some businesses' revenue is derived from advertisements. The manner in which these advertisements are presented to a viewers and the way these viewers interact with and/or perceive the presented advertisements is very important to the success of these businesses.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for providing and handling product and service discounts, and location based services in an automatic content recognition based system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for providing and handling product and service discounts, and location based services in an automatic content recognition (ACR) based system. In various exemplary embodiments of the invention, an automatic content recognition enabled display communication device may present a linear advertisement campaign. A second screen communication device (SSCD), which may be paired with an automatic content recognition enabled display communication device, may be operable to detect when content associated with a linear advertisement campaign is available for display on the second screen communication device. A location of the second screen communication device may be determined when the second screen communication device detects that the content associated with the linear advertisement campaign is available for display. The second screen communication device may be operable to customize content for presentation on the second screen communication device in order to offer one or more products and/or services to the viewer of the second screen communication device based on the determined location.

The second screen communication device may be operable to determine assets that may be required and/or utilized for the customization of the content so that it may be presented on the second screen communication device. The second screen communication device may be operable to acquire the determined assets from one or more servers. The second screen communication device may be operable to control presentation of the content based on information corresponding to the acquired assets. The second screen communication device may be operable to generate additional content for presentation on the second screen communication device based on the acquired assets and/or information acquired from the one or more servers.

The second screen communication device may also be operable to store promotional content associated with the generated additional content in a digital repository, for example, as a digital wallet, which may be associated with the second screen communication device and/or the viewer of the second screen communication device. The promotional content may comprise a coupon and/or special offer, for example. The generated additional content may comprise one or more addresses of websites and/or places where the coupon and/or the special offer may be redeemed or otherwise utilized. The generated additional content may comprise one or more options that enables a viewer of the second screen communication device to configure the one or more products and/or services based on personal preferences of the viewer. The generated additional content may comprise one or more options that enables the viewer of the second screen communication device to purchase and/or request additional information on the one or more products and/or services.

Figure 1:
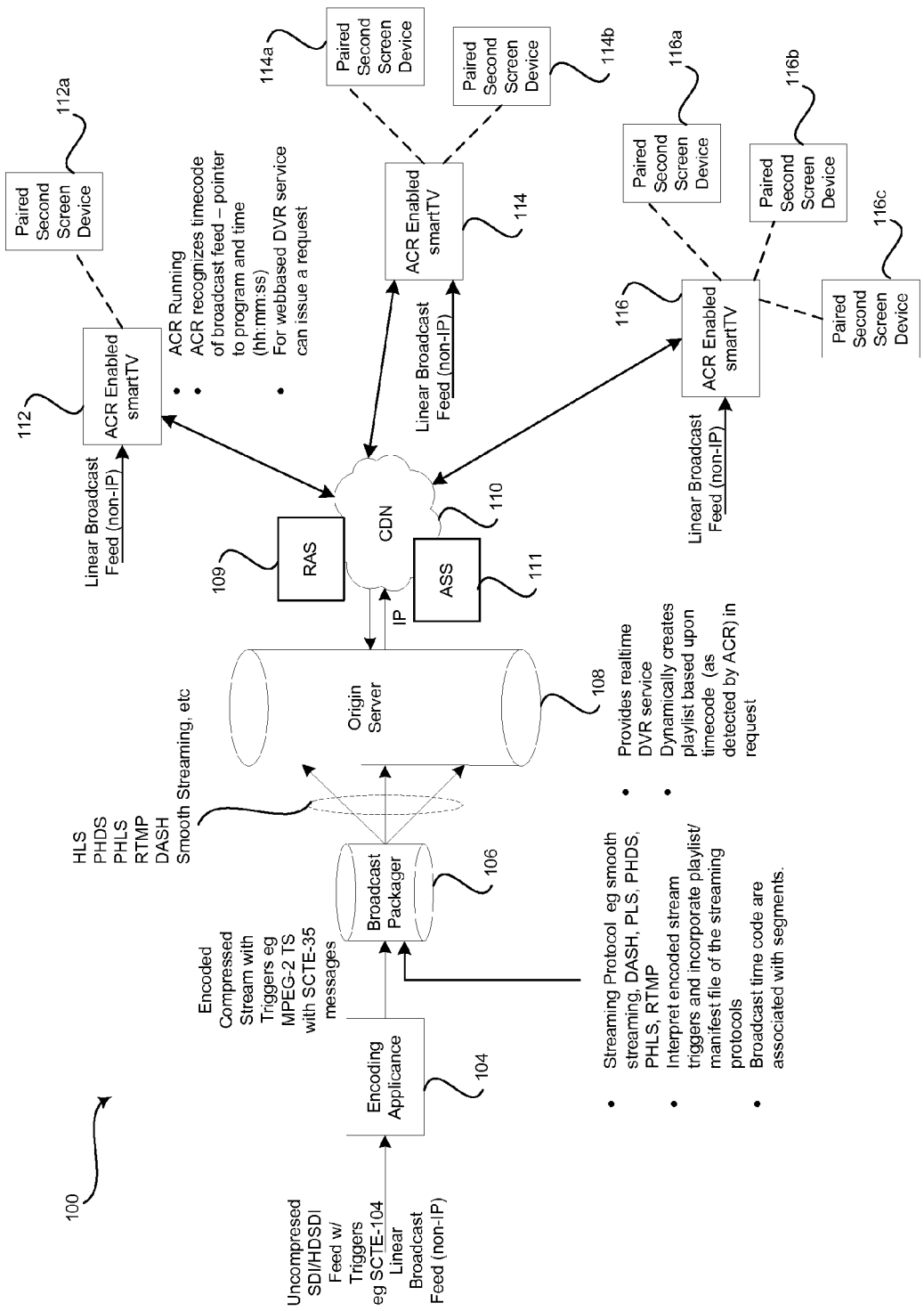
FIG. 1 is a diagram that illustrates an exemplary system for automatic content recognition (ACR) integration for smart-TVs and mobile communication devices, in accordance with an exemplary embodiment of the disclosure.

FIG. 1 is a diagram that illustrates an exemplary system for automatic content recognition integration for smartTVs and mobile communication devices, in accordance with an exemplary embodiment of the invention. Referring to FIG. 1, there is shown a exemplary system for automatic content recognition integration for smartTVs and mobile communication devices 100 comprising an encoding appliance 104, a broadcast packager 106, an origin server 108, a reference advertisement server (RAS) 109, a content delivery network (CDN) 110, an advertisement synchronization server (AdSS) 111, a plurality of ACR-enabled smartTVs 112, 114, 116 and a plurality of paired second screen communication devices 112a, 114a, 114b, 116a, 116b, 116c.

The encoding appliance 104 may comprise suitable logic, circuitry, interfaces and/or code that may be operable to encode a received feed into one or more encoded formats and accordingly generate one or more corresponding output encoded feeds. The encoding appliance 104 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. SCTE-104 enables the insertion of advertisements (commercials) and custom content such as the ACR-based triggers and assets in the HD SDI broadcast stream. The encoding appliance 104 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. SCTE-35 is a standardized advertisement insertion specification that is utilized to define, for example, cue and insertion points in MPEG-2 transport streams.

The broadcast packager 106 may comprise suitable logic, circuitry, interfaces and/or code that may be operable to receive the encoded compressed stream with the SCTE-35 triggers and packages the content in one or more IP based web delivery formats. In an embodiment of the disclosure, the broadcast packager 106 may be operable to package at least a portion of the encoded compressed stream with the SCTE-35 triggers into streaming or segmented streaming protocol formats. Exemplary streaming or segmented streaming protocol formats may comprise, for example, hypertext transport protocol (HTTP) Live Streaming (HLS) format, Microsoft smooth streaming, Dynamic Adaptive Streaming over HTTP (DASH) (also referred to as MPEG-DASH), Protected HTTP Dynamic Streaming (PHDS), Protected HTTP Live Streaming (PHLS), and real time messaging protocol (RTMP). The broadcast packager 106 may be operable to interpret the encoded stream triggers and incorporate playlists and/or manifests file for the streaming protocols. The broadcast packager 106 may also be operable to handle the processing and insertion of broadcast time codes as obtained from an internal system clock or external NTP (Network Time Protocol) based source into the packaged content for the various broadcast stream formats. In the case of segmented streaming protocols (e.g., HLS, DASH, Microsoft Smooth Streaming, and HDS/pHDS) the packager may use broadcast timecodes as part of the naming convention of the stream 'chunks' so as to enable DVR playback via dynamic playlist creation. The packaged content for the various broadcast stream formats generated by the broadcast packager 106 may comprise one or more IP-based digital streams.

The origin server 108 may comprise suitable logic, circuitry, interfaces and/or code that may be operable to store the packaged content for the various IP-based broadcast stream formats. The origin server 108 may also be operable to post assets (e.g. IP-based version of the asset with corresponding metadata declarations in the manifest files) to one or more servers or storage devices within the content delivery network 110. The assets may comprise, for example, graphics, banners, overlays, text, audio, video and so on, which may be utilized by the ACR-enabled smartTVs 112, 114, 116. As noted in the diagram, the origin server 108 may also be operable to provide a real time DVR service via dynamic playlist creation based upon start and stop timecodes in the request. This may also be provided by the content delivery network 110.

The content delivery network 110 may comprise suitable logic, circuitry, interfaces and/or code that may be operable to deliver IP-based content from the origin server 108 to each of the ACR-enabled smartTVs 112, 114, 116. Although not shown, the content delivery network 110 may comprise one or more servers, store devices, switches, transport devices and medium that enables delivery of the IP-based content from the origin server 108 to the ACR-enabled smartTVs 112, 114, 116. In an embodiment of the disclosure, the content delivery network 110 may comprise a cloud-based content delivery network. The content delivery network 110 may be operable to handle storage and/or distribution of the assets that may be posted from the origin server 108. The content delivery network 110 may be operable to handle communication and/or distribution of the assets, which may comprise, for example, graphics, banners, overlays, text, audio and/or video to the ACR-enabled smartTVs 112, 114, 116. It may be operable to provide a dynamic DVR service as mentioned above.

The reference advertisement server (RAS) 109 may comprise suitable logic, circuitry, interfaces and/or code that may be operable to store information and/or assets, for non-ACR events, for one or more advertisement campaigns. In this regard, when non-ACR events occur, one or more of the paired second screen communication devices 112a, 114a, 114b, 116a, 116b, 116c may be operable to acquire the corresponding assets for a particular advertisement campaign from the reference advertisement server 109. The acquired corresponding assets for a particular advertisement campaign may be utilized for message sequencing for synchronized advertisements, advertisement frequency capping, advertisement highlighting and/or offering of products and/or services based on interaction with advertisements. The acquired corresponding assets for a particular advertisement campaign may be utilized for providing of product and service discounts and well as providing location based services (LBS) in an automatic content recognition system.

The advertisement synchronization server (AdSS) 111 may comprise suitable logic, circuitry, interfaces and/or code that may be operable to store information regarding the assets, for ACR events, for one or more advertisement campaigns. In this regard, when ACR events occur, one or more of the paired second screen communication devices 112a, 114a, 114b, 116a, 116b, and/or 116c may be operable to determine the corresponding information regarding the assets that are to be utilized for a particular advertisement campaign from the advertisement synchronization server 111. Once the corresponding information for the asset for the particular advertisement campaign is determined, the paired second screen communication devices 112a, 114a, 114b, 116a, 116b, and/or 116c may be operable to utilize the determined information to acquire the assets, which are to be utilized for the advertisement campaign, from the reference advertisement server (RAS) 109. In some embodiments of the disclosure, the functionality of the RAS 109 may be incorporated within the AdSS 111. The acquired corresponding assets for a particular advertisement campaign may be utilized for message sequencing for synchronized advertisements, advertisement frequency capping, advertisement highlighting and/or offering of products and/or services based on interaction with advertisements. The acquired corresponding assets for a particular advertisement campaign may be utilized for providing product and service discounts as well as providing location based services (LBS) in an automatic content recognition system.

Each of the plurality of ACR-enabled smartTVs 112, 114, 116 may comprise suitable logic, circuitry, interfaces and/or code that may be operable to consume content from a linear broadcast feed. Each of the plurality of ACR-enabled smartTVs 112, 114, 116 may be operable to receive IP-based broadcast content from the origin server 108 and/or Internet based multimedia content, which may be delivered via the content delivery network 110. Each of the ACR-enabled smartTVs 112, 114, 116 may be operable to handle automatic content recognition for the delivered broadcast content.

The ACR-enabled smartTVs 112, 114, 116 may comprise connected TVs with paired devices such as tablets, and second screen communication devices such as Smartphones and tablets, for example. The ACR-enabled smartTVs 112, 114, 116 may be referred to as viewer devices, for example. Since an ACR system may comprise a plurality of fingerprint match systems, each of which supports a different ACR or fingerprint technology, the ACR-enabled smartTVs 112, 114, 116 that support a particular fingerprint technology are operable to communicate with a compatible corresponding fingerprint match system. Moreover, when a secondary or paired device, for example, the paired second screen communication devices 112a, 114a, 114b, 116a, 116b, 116c, supports a particular fingerprint technology, the secondary or paired device may also be operable to communicate with the corresponding fingerprint match system that supports the compatible fingerprint technology. U.S. application Ser. No. 13/730,352, which was filed on Dec. 28, 2012 discloses a fingerprint match system and is hereby incorporated herein by reference in its entirety. An abstraction layer may refer to, for example, the ability of an ACR system to assign the same event identifiers to different sets of video fingerprints that are generated by different video fingerprint technologies. That is, by appropriately timing the assignment of event identifiers to multiple sequences of video fingerprints that are generated from the same video content but with different video fingerprinting technologies, a single ACR system is able to support video fingerprinting technologies from multiple vendors. This approach allows the ACR system to be both flexible and scalable with respect to fingerprint technology vendors. Interactive event identifiers may be utilized in a television system and/or in a web system to trigger interactive events. When an ACR event is triggered in one of the ACR-enabled smartTVs 112, 114, 116, an invitation may be provided to one or more of the plurality of paired second screen communication devices 112a, 114a, 114b, 116a, 116b, 116c, which enables secondary content associated with the delivered broadcast to be consumed by one or more of the plurality of paired second screen communication devices 112a, 114a, 114b, 116a, 116b, 116c. For example, an ACR event may be triggered in the ACR-enabled smartTV 114 while delivered linear broadcast content is being consumed and presented by the ACR-enabled smartTV 114 and an invitation or notification may be displayed on the ACR-enabled smartTV 114 and/or provided to the paired second screen communication device 114b. The invitation or notification may indicate that corresponding secondary content associated with the delivered linear broadcast content being consumed by the ACR-enabled smartTVs 114 may be available for consumption by the paired second screen communication device 114b.

Each of the plurality of paired second screen communication devices 112a, 114a, 114b, 116a, 116b, 116c may comprise suitable logic, circuitry, interfaces and/or code that may be operable to handle the consumption of multimedia content. Each of the paired second screen communication devices 112a, 114a, 114b, 116a, 116b, 116c may comprise mobile communication devices. A second screen communication device, which may be paired with one or more of the ACR-enabled smartTVs, may be operable to handle consumption of secondary content associated with the delivered broadcast that is consumed by one or more of the plurality of paired second screen communication devices. The second screen communication device 112a may be paired with the ACR-enabled television 112. The second screen communication devices 114a, 114b may be paired with the ACR-enabled television 114. The second screen communication devices 116a, 116b, 116c may be paired with the ACR-enabled television 116. A second screen communication device, which may be paired with an ACR-enabled smartTV, may be operable to receive an indication that secondary content, which may be associated with the delivered broadcast being consumed by the ACR-enabled smartTV, may be available for consumption by the second screen communication device. For example, the second screen communication device 112a may be operable to receive an indication or notification when secondary content associated with the delivered broadcast being consumed by the ACR-enabled smartTV 112, may be available for consumption by the second screen communication device 112a. The indication may comprise an audio and/or visual notification. In this regard, the indication or notification may comprise one or more tones, a banner, a pop-up window, an animation, a short message service (SMS) alert, an audio and/or visual message, and/or other type of notification.

In operation, a viewer may be consuming broadcast content that is being delivered to and presented on the ACR-enabled smartTV 116 via a linear broadcast feed. An ACR event may be triggered during consumption and/or presentation of the broadcast content in the ACR-enabled smartTV 116. The triggered ACR event may cause the generation of an invitation or notification on the ACR-enabled smartTV 116 and/or on one or both of the paired second screen communication devices 116a, 116b. The invitation or notification may indicate that corresponding secondary content associated with the delivered broadcast content being consumed by the ACR-enabled smartTVs 116 may be available for consumption by the paired second screen communication devices 116a, 116b and/or 116c. The viewer may acknowledge the notification on the paired second screen communication device 116a in order to initiate consumption of the secondary content on the paired second screen communication device 116a. The viewer may optionally defer consumption of the secondary content on the paired second screen communication device 116a or the paired second screen communication device 116b until a subsequent time. In accordance with some embodiments of the disclosure, two viewers may be operable to utilize corresponding versions of the paired second screen communication devices 116a, 116b to concurrently consume the secondary content and may share the same viewer experience (e.g. multiplayer game, poll, collaborative gaming, trivia, etc.). In accordance with some embodiments of the disclosure, two viewers may be operable to utilize corresponding versions of the paired second screen communication devices 116a, 116b to independently consume the secondary content and may have the same viewer experience or different viewer experiences.

In accordance with various embodiments of the disclosure, the system for automatic content recognition integration for smartTVs and mobile communication devices 100 is operable to generate one or more IP-based digital streams that corresponds to a linear feed or linear broadcast feed. The generation of the IP-based digital streams may not necessarily be part of the automatic content recognition system. Accordingly, the IP-based digital streams may simply be part of the IP based versions of the broadcast stream. In general, the linear feed or linear broadcast feed may be a non-IP based feed. However, in some systems, the linear feed or linear broadcast feed may be an IP based feed. Accordingly, the linear feed or linear broadcast feed may be generically referred to as a live feed, which may be delivered by the multi-channel video programming distributor (MVPD), which is described with respect to, for example, FIG. 2. In instances when the viewer may be consuming the secondary content on a paired second screen communication device, it may be desirable for the viewer to return to consuming the broadcast content in the linear feed at the point where they were invited to interact with the secondary content. In this regard, the system for automatic content recognition integration for smartTVs and mobile communication devices 100 may switch from providing the broadcast content via the linear feed to providing the corresponding content via an IP-based digital stream whose source may be the content provider, the multi-channel video programming distributor (MVPD), which is described with respect to, for example, FIG. 2, and/or a third party.

Figure 2:
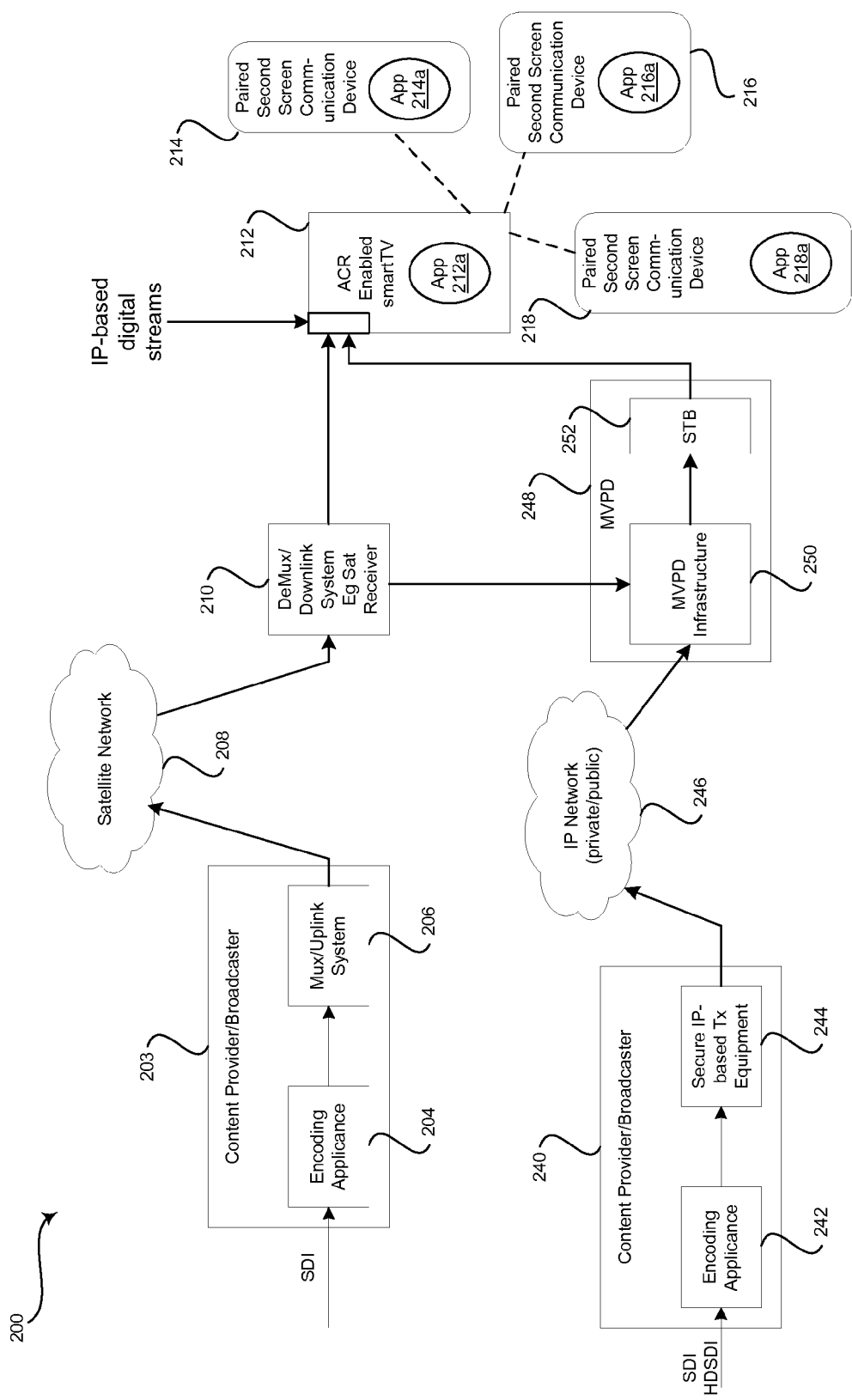
FIG. 2 is a diagram that illustrates an exemplary system for automatic content recognition (ACR) integration for smart-TVs and mobile communication devices, which utilizes a plurality of broadcast feeds, in accordance with an exemplary embodiment of the disclosure.

FIG. 2 is a diagram that illustrates an exemplary system for automatic content recognition (ACR) integration for smart-TVs and mobile communication devices, which utilizes a plurality of satellite broadcast feeds, in accordance with an exemplary embodiment of the disclosure. Referring to FIG. 2, there is shown a system for automatic content recognition (ACR) integration for smartTVs and mobile communication devices 200, which utilizes a satellite broadcast feed. The system for automatic content recognition (ACR) integration for smartTVs and mobile communication devices 200 comprises a content provider/broadcaster 203, a satellite network 208, a content provider/broadcaster 240, and IP network 246, a multichannel video programming distributor (MVPD) 248, an ACR-enabled smartTV 212, and a plurality of paired second screen communication devices 214, 216, 218. The content provider/broadcaster 203 comprises an encoding appliance 204, and a multiplexer (mux) and uplink system 206. The content provider/broadcaster 240 comprises an encoding appliance 242, and secure IP-based transmission equipment 244. The MVPD 240 may comprise an MVPD infrastructure 250 and a set-top box (STB) 252. The system for automatic content recognition (ACR) integration for smartTVs and mobile communication devices 200, which utilizes a satellite broadcast feed is operable to deliver a linear broadcast feed to one or more ACR-enabled smartTVs such as the ACR-enabled smartTV 212.

The content provider/broadcaster 203 may be operable to generate content, which may be delivered to the ACR-enabled smartTV 212 via the satellite network 208.

The encoding appliance 204 may comprise suitable logic, circuitry, interfaces and/or code that may be operable to encode a received feed into one or more encoded formats and accordingly generate one or more corresponding output encoded feeds. The encoding appliance 204 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 104 may be operable to encode the received linear broadcast feed and generate an MPEG-2 transport stream (TS) with SCTE-35 messages. The encoding appliance 204 may be substantially similar to the encoding appliance 104, which is shown and described with respect to FIG. 1.

The multiplexer and uplink system 206 may comprise suitable logic, circuitry, interfaces and/or code that may be operable to receive the encoded output feeds from the encoding appliance 204 and multiplex them into a multiplexed encoded feed for communication to the satellite network 208. In accordance with an embodiment of the disclosure, the multiplexer and uplink system 206 may comprise, for example, a satellite headend. It should be noted that in some embodiments of the disclosure, a content provider's live broadcast stream may be delivered directly via an IP based connection to the multi-channel video programming distributor (MVPD), which is described with respect to, for example, FIG. 2, directly.

The satellite network 208 may comprise one or more satellites that may be operable to receive the multiplexed encoded feed from the multiplexer and uplink system 206 and broadcast the corresponding content via one or more downlink satellite channels. In this regard, the satellite network 208 may comprise suitable logic, circuitry, interfaces, devices and/or code that may be operable to receive the multiplexed encoded feed from the multiplexer and uplink system 206 and broadcast the corresponding content via one or more downlink satellite RF channels.

The demultiplexer and downlink system 210 may comprise suitable logic, circuitry, interfaces and/or code that may be operable to receive and demodulate the one or more downlink satellite RF channels comprising the multiplexed encoded feed. The output from the demultiplexer and downlink system 210 may be communicated to the ACR enabled smartTV 212, which may be operable to tune to and decrypt the one or more downlink satellite RF channels. The output from the demultiplexer and downlink system 210 may also be communicated to the multichannel video programming distributor 248, which may be a radio frequency (RF), an intermediate frequency (IF), satellite, cable, and/or IP based distribution system. In this regard, the demultiplexer and downlink system 210 may be operable to communicate one or more corresponding demodulated downlink satellite RF channels to the multichannel video programming distributor 248, which may distribute and deliver live linear broadcast content, through the multichannel video programming distributor infrastructure 250, to the ACR-enabled smartTV 212 via the set-top box 252.

The ACR-enabled smartTV 212 may comprise suitable logic, circuitry, interfaces and/or code that may be operable to consume the live linear feed of the broadcast content from the demux/downlink system 210 and/or Internet based multimedia content, which may be delivered via the satellite network 208. The ACR-enabled smartTV 212 may also be operable to consume live linear feed of the broadcast content from the set-top box 252, and/or Internet based multimedia content, which may be delivered via the IP network 246. The ACR-enabled smartTV 212 may be operable to handle automatic content recognition for the delivered broadcast content. The ACR-enabled smartTV 212 may be substantially similar to each of the ACR-enabled smartTVs 112, 114, 116, which are shown and described with respect to FIG. 1.

Each of the plurality of paired second screen communication devices 214, 216, 218 may comprise suitable logic, circuitry, interfaces and/or code that may be operable to handle the consumption of multimedia content. Each of the plurality of paired second screen communication devices 214, 216, 218 may comprise mobile communication devices and may be paired with the ACR-enabled smartTV 212. In this regard, each of the plurality of paired second screen communication devices 214, 216, 218, which may be paired with the ACR-enabled smartTV 212, may be operable to consume and interact with secondary content associated with the linear delivered broadcast content, which is being consumed by the ACR-enabled smartTV 212. The paired second screen communication devices 214, 216, 218 may be paired with the ACR-enabled smartTV 212. Each of the plurality of paired second screen communication devices 214, 216, 218 may be substantially similar to the paired second screen communication devices 116a, 116b, 116c, which are disclosed and described with respect to FIG. 1.

One or more of the plurality of paired second screen communication devices 214, 216, 218 may be operable to receive an indication that secondary content, which may be associated with the linear delivered broadcast content being consumed by the ACR-enabled smartTV 212, may be available for consumption by the paired second screen communication device. For example, one or more of the plurality of paired second screen communication devices such as the second screen communication device 214 may be operable to receive an indication or notification when secondary content associated with the linear delivered broadcast being consumed by the ACR-enabled smartTV 212, may be available for consumption by the second screen communication device 214.

Each of the plurality of paired second screen communication devices 214, 216, 218 may comprise an application (app), which is operable to handle the notification, communication and interaction with the secondary content that is associated with the linear delivered broadcast content being consumed by the ACR-enabled smartTV 212. In this regard, the paired second screen communication device 214 may comprise an application 214a, the paired second screen communication device 216 may comprise an application 216a and the paired second screen communication device 218 may comprise an application 218a. The applications 214a, 216a, 218a may be operable to receive a signal or message, which serves as an indication or notification that the secondary content associated with the delivered broadcast being consumed by the ACR-enabled smartTV 212 is available for presentation on the corresponding paired second screen communication devices 214, 216, 218. The applications 214a, 216a, 218a running on the paired second screen communication devices 214, 216, 218 may comprise an application, which runs on top of an operating system of the corresponding paired second screen communication devices 214, 216, 218 or an application which may be integrated as part of an operating system of the corresponding paired second screen communication devices 214, 216, 218. The applications 214a, 216a, 218a may run in the background or may be activated when the secondary content associated with the delivered broadcast being consumed by the ACR-enabled smartTV 212 is available. The applications 214a, 216a, 218a may comprise a user interface that may be operable to generate and/or display one or more control elements such as buttons, icons, visual aids and/or audio aids that enables interaction with the secondary content displayed the corresponding paired second screen communication devices 214, 216, 218.

The content provider/broadcaster 240 may be operable to generate content, which may be delivered to the ACR-enabled smartTV 212 via the IP network 246.

The encoding appliance 242 may comprise suitable logic, circuitry, interfaces and/or code that may be operable to encode a received feed into one or more encoded formats and accordingly generate one or more corresponding output encoded feeds. The encoding appliance 242 may be operable to receive an uncompressed (high definition) serial digital interface (HDSDI) protocol feed, which may comprise embedded metadata triggers that can include frame accurate declarations of advertisement and program time boundaries. The uncompressed (high definition) serial digital interface (HDSDI) protocol feed comprises a linear broadcast feed and as such, is a non-Internet Protocol (non-IP) feed or stream. In an exemplary embodiment of the disclosure, the serial digital interface (SDI/HDSDI) protocol feed may comprise a SCTE-104 SDI protocol feed. SCTE-104 is a standardized metadata insertion specification that may be utilized to declare digital insertion points of program and advertisement content in high definition (HD) SDI streams. The encoding appliance 204 may be operable to encode the received linear broadcast feed and generate an encoded compressed stream with content triggers translated from the broadcast SCTE-104 messages. In an exemplary embodiment of the disclosure, the encoding appliance 242 may be operable to encode the received linear broadcast feed and generate an MPEG-2 transport stream (TS) with SCTE-35 messages. The encoding appliance 242 may be substantially similar to the encoding appliance 104, which is shown and described with respect to FIG. 1.

The secure IP-based transmission equipment 244 may comprise suitable logic, interfaces, and/or code that may be operable to receive secure the generated MPEG-2 transport stream (TS) with SCTE-35 messages, which are received from the encoding appliance 242. In this regard, the secure IP-based transmission equipment 244 may be operable to encrypt the content from the encoding appliance 242, which comprises the MPEG-2 transport stream (TS) with SCTE-35 messages, so that it may be securely transported via the IP network 246.

The IP-network 246 may comprise suitable devices and/or interfaces that may be operable to receive content from the content provider/broadcaster 240 and communicate the received content to the multichannel video programming distributor 248. In this regard, the IP-network 246 may be operable to handle the communication of encrypted content, which may be received from the secure IP-based transmission equipment 244, to the multichannel video programming distributor 248.

The multichannel video programming distributor 248 may comprise suitable devices and/or interfaces that may be operable to deliver live linear content to the ACR-enabled smartTV 212 via the set-top box 252. The multichannel video programming distributor 248, may comprise a radio frequency (RF), an intermediate frequency (IF), satellite, cable, and/or IP based distribution system. The MVPD 248 may be operable to receive live linear content from the content provider/broadcaster 240 via the IP network 246. The MVPD 248 may also be operable to receive live linear content from the content provider/broadcaster 203 via the satellite network 208 and the DeMux/Downlink system 210. The MVPD 248 may comprise a MVPD infrastructure 250 and the set-top box (STB) 252.

The multichannel video programming distributor (MVPD) infrastructure 250 may comprise suitable devices and/or interfaces that may be operable to receive live linear content from the content providers/broadcasters 203, 240. In this regard, the MVPD infrastructure 250 may comprise, for example, satellite and/or cable equipment and infrastructure. The MVPD infrastructure 250 may receive live linear content from the satellite network 208 via the DeMux/Downlink system 210, and also from the IP network 246. The MVPD infrastructure 250 may be operable to communicate the received live linear content to the set-top box 252.

The set-top box (STB) 252 may comprise suitable logic, circuitry, interfaces and/or code that may be operable to receive linear content, which may be encrypted for secured, from the MVPD infrastructure 250. The set-top box (STB) 252 may be operable to tune to one or more channels and decrypt the live linear content. The decrypted live linear content may be communicated from the set-top box 252 to the ACR-enabled smartTV 212. The set-top box 252 may comprise a hardware set-top box or a virtual set-top box.

In operation, a viewer may be consuming linear broadcast content that is being delivered to and presented on the ACR-enabled smartTV 212 via the satellite network 208. An ACR event may be triggered during consumption and/or presentation of the linear delivered broadcast content in the ACR-enabled smartTV 212. The triggered ACR event may cause the generation of an invitation or notification on one or both of the paired second screen communication devices 214, 216, 218. The invitation or notification may indicate that corresponding secondary content associated with the delivered linear broadcast content being consumed by the ACR-enabled smartTVs 212 may be available for consumption by the one or more of the plurality of paired second screen communication devices 214, 216, 218. In an exemplary embodiment of the disclosure, the viewer may acknowledge the notification on the paired second screen communication device 214 in order to initiate consumption of the secondary content on the paired second screen communication device 214. The consumption of the delivered linear broadcast content by the ACR-enabled smartTVs 212 may be paused (as observed by the viewer) at about the time the viewer initiates consumption of the secondary content on the paired second screen communication device 214. The viewer may optionally defer consumption of the secondary content on the paired second screen communication device 214 until a subsequent time utilizing the application 214*a*.

In instances where the viewer has completed interacting with the secondary content on the paired second screen communication device 214, the viewer may resume consumption of the linear broadcast content on the ACR-enabled smartTV 212. The viewer may resume the consumption of the linear broadcast content on the ACR-enabled smartTV 212 to the current point of the linear broadcast. In this regard, the viewer misses out on the content that was presented in the linear broadcast content between the time at which the delivered linear broadcast content was paused on the ACR-enabled smartTV 212 and the time just before resuming consumption of the linear broadcast content on the ACR-enabled smartTV 212. In accordance with various embodiments of the disclosure, the viewer may resume the consumption of the linear broadcast content on the ACR-enabled smartTV 212 to the time at which the delivered linear broadcast content was paused on the ACR-enabled smartTV 212. In this regard the viewer does not miss out on any content that was presented in the linear broadcast content after the time at which the delivered linear broadcast content was paused on the ACR-enabled smartTV 212. The ACR-enabled smartTV 212 may be operable to switch from the linear broadcast content and consume content from a corresponding IP-based digital stream. Once the switch to the corresponding IP-based digital stream occurs, the ACR-enabled smartTV 212 presents the broadcast content from the corresponding time and position at which the delivered broadcast content in the linear feed was paused.

In accordance with some embodiments of the disclosure, two viewers may be operable to utilize corresponding versions or implementations of the paired second screen communication devices 214, 216 to concurrently consume the secondary content and may share the same viewer experience. In accordance with some embodiments of the disclosure, two viewers may be operable to utilize corresponding implementations or versions of the paired second screen communication devices 216, 218 to independently consume the secondary content and may have the same viewer experience or different viewer experiences.

Figure 3:
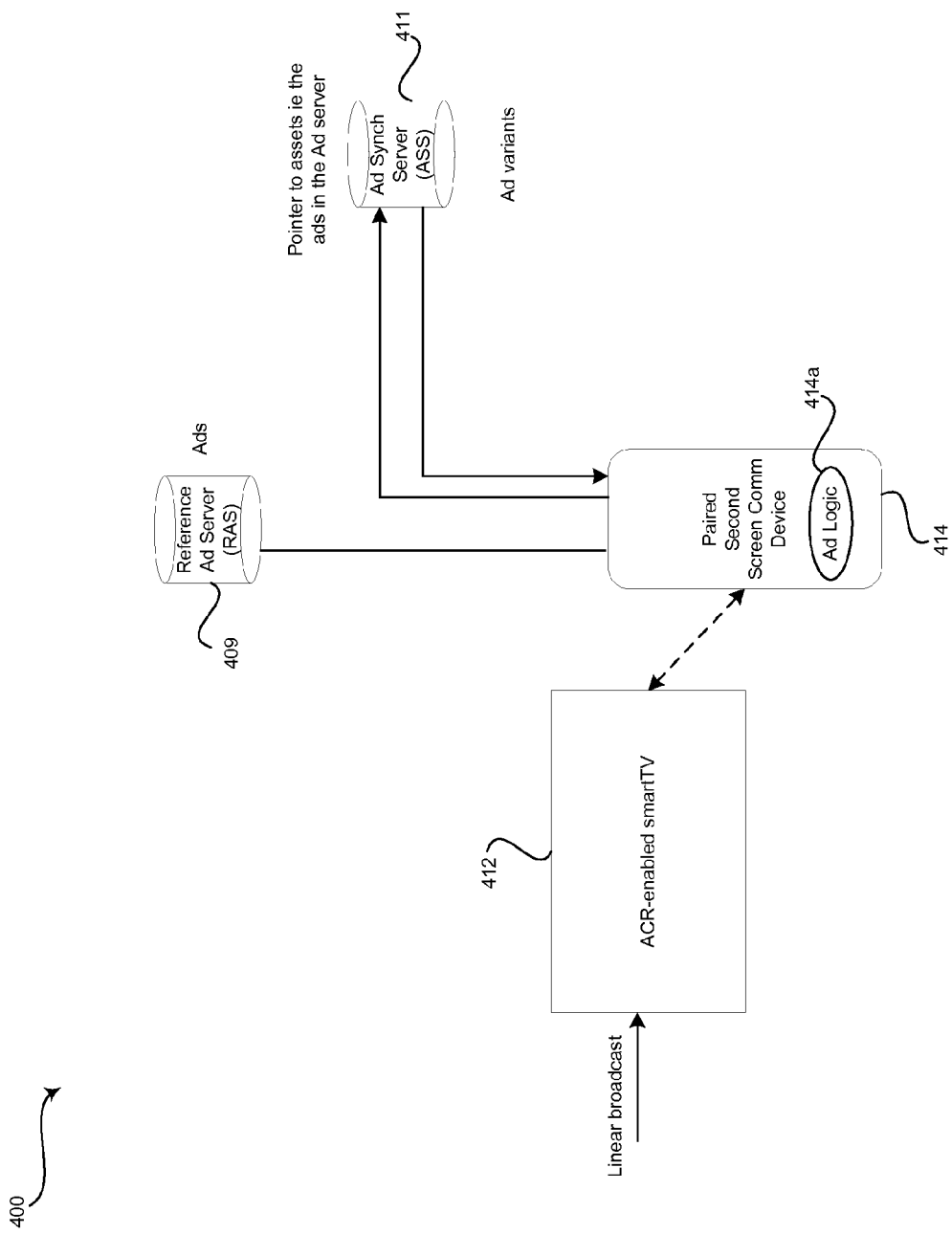
FIG. 3 is a diagram that illustrates an exemplary system for providing and handling product and service discounts and location based services in an automatic content recognition based system, in accordance with an exemplary embodiment of the invention.

FIG. 3 is a diagram that illustrates an exemplary system for providing and handling product and service discounts and location based services in an automatic content recognition based system, in accordance with an exemplary embodiment of the invention. Referring to FIG. 3, there is shown a system for providing and handling product and service discounts and location based services in an automatic content recognition based system 400. The system for providing and handling product and service discounts and location based services in an automatic content recognition based system 400 may comprise a reference advertisement Server (RAS) 409, an advertisement synchronization server (AdSS) 411, and ACR-enabled smartTV 412 and a paired second screen communication device 414. The paired second screen communication device 414 may comprise an advertisement logic application or module 414a.

The reference advertisement server (RAS) 409 may comprise suitable logic, circuitry, interfaces and/or code that may be operable to store assets, for non-ACR events, for one or more advertisement campaigns. In this regard, when non-ACR events occur, the reference advertisement server 409 may be operable to serve the corresponding assets for a particular advertisement campaign to the paired second screen communication device 414. In this regard, the corresponding information and/or assets may be utilized to handle message sequencing, advertisement frequency capping, advertisement highlighting and/or detection of viewer download speed and providing an option for the viewer to switch service. The acquired corresponding information and/or assets for a particular advertisement campaign may also be utilized for providing and handling product and service discounts, and location based services in an automatic content recognition based system.

The advertisement synchronization server (AdSS) 411 may comprise suitable logic, circuitry, interfaces and/or code that may be operable to store information regarding the assets, for ACR events, for one or more advertisement campaigns. In this regard, when ACR events occur, the paired second screen communication devices 414 may be operable to determine the corresponding information regarding the assets that are to be utilized for a particular advertisement campaign from the advertisement synchronization server 411. Once the corresponding information for the asset for the particular advertisement campaign is determined, the paired second screen communication device 414 may be operable to utilize the determined information to acquire the assets, which are to be utilized for the advertisement campaign, from the reference advertisement server 409. In this regard, the corresponding information and/or assets may be utilized to handle message sequencing, advertisement frequency capping, advertisement highlighting and/or detection of viewer download speed and providing an option for the viewer to switch service. The acquired corresponding information and/or assets for a particular advertisement campaign may also be utilized for providing and handling product and service discounts, and location based services in an automatic content recognition based system.

The paired second screen communication device 414 may comprise suitable logic, circuitry, interfaces and/or code that may be operable to display synchronized messages for a particular advertisement campaign that is being presented on the ACR-enabled smartTV 412. The paired second screen communication device 414 may also be operable to handle message sequencing, advertisement frequency capping, advertisement highlighting and/or detection of viewer download speed and providing an option for the viewer to switch service. The paired second screen communication device 414 may also handle providing of product and service discounts, and location based services in an automatic content recognition based system.

The advertisement logic application or module 414a may comprise suitable logic and/or code that may be operable to handle the presentation of content that is representative of the synchronized messages for a particular advertisement campaign that is being presented on the ACR-enabled smartTV 412. The advertisement logic application or module 414a may comprise an application that may be running on an operating system of the paired second screen communication device 414 or may comprise a module that may be integrated as part of the operating system of the paired second screen communication device 414. The advertisement logic application or module 414a may be operable to handle message sequencing, advertisement frequency capping, advertisement highlighting and/or detection of viewer download speed and providing an option for the viewer to switch service. The advertisement logic application or module 414a may be operable to handle providing of product and service discounts, and location based services in an automatic content recognition based system.

Figure 4:
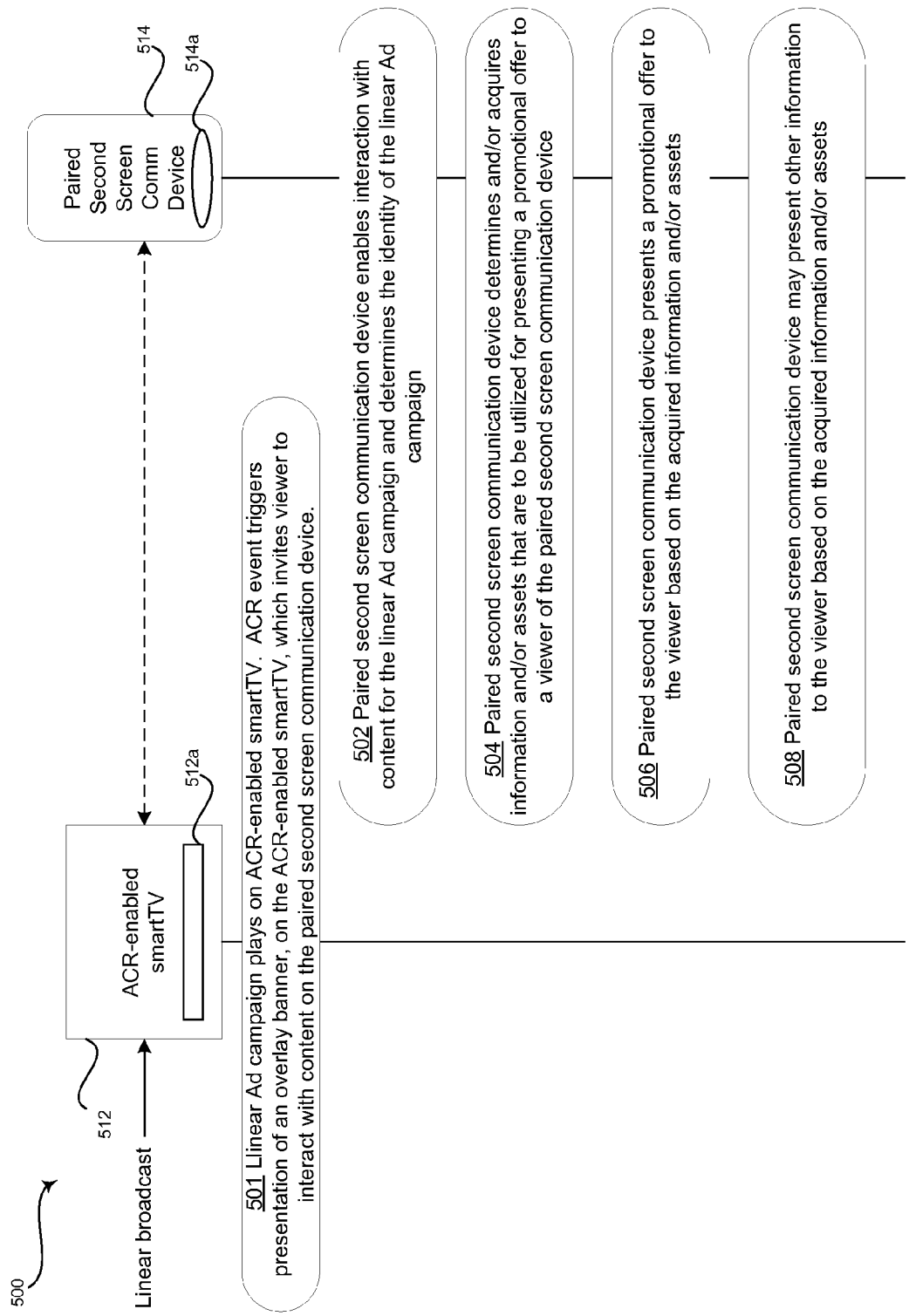
FIG. 4 is a flow diagram that illustrates exemplary providing of product and service promotions, in accordance with an exemplary embodiment of the invention.

FIG. 4 is a flow diagram that illustrates exemplary providing of product and service promotions, in accordance with an exemplary embodiment of the invention. Referring to FIG. 4, there is shown exemplary providing of product and service promotions 500. For the exemplary providing of product and service promotions 500, there is shown a ACR-enabled smartTV 512, a paired second screen communication device 514 and a plurality of steps 501 through 508.

The paired second screen communication device 514 may comprise an advertisement logic application or module 514a. The paired second screen communication device 514 may be substantially similar to the paired second screen communication device 414, which is illustrated and described with respect to, for example, FIG. 3. The advertisement logic application or module 514a may be substantially similar to the advertisement logic application or module 414a, which is illustrated and described with respect to, for example, FIG. 3. In some embodiments of the invention, the paired second screen communication device 514 may be operable to utilize audio automatic content recognition.

The ACR-enabled smartTV 512 is operable to receive a linear broadcast feed. The received linear broadcast feed may comprise a linear advertisement (Ad) campaign, for example, the linear advertisement (Ad) campaign. The linear advertisement (Ad) campaign may comprise an ACR triggered advertisement or a regular advertisement with no ACR (non-ACR) triggered events. Notwithstanding, the invention is not limited in this regard. Accordingly, in some embodiments of the invention, the linear advertisement (Ad) campaign may comprise some content, which may be ACR triggered and some content which may be non-ACR triggered.

In step 501, a linear advertisement (Ad) campaign plays on the ACR-enabled smartTV 512. An ACR event triggers presentation of an overlay banner, on the ACR-enabled smartTV 512, which invites a viewer of the ACR-enabled smartTV 512 to interact with content on the paired second screen communication device 514.

In step 502, the paired second screen communication device 514 enables interaction with content for the linear Ad campaign and determines the identity of the linear Ad campaign. The paired second screen communication device 514 may be operable to detect when content for the linear Ad campaign is available for interaction on the paired second screen communication device 514.

In step 504, the paired second screen communication device 514 may determine and/or acquire information and/or assets that are to be utilized for presenting an offer to a viewer of the paired second screen communication device 514. In this regard, the paired second screen communication device 514 may be operable to acquire the information and/or assets from the RAS 409 (FIG. 3) and/or the AdSS 411 (FIG. 3).

In step 506, the paired second screen communication device 514 may present a promotional offer to the viewer based on the acquired information and/or assets.

In step 508, the paired second screen communication device 514 may present other information to the viewer based on the acquired information and/or assets. For example, the paired second screen communication device 514 may present product location information, a questionnaire, trivia, reviews, frequently asked information about a particular product or service, and so on.

For non-ACR events, the paired second screen communication device 514 may go directly to the RAS 409 (FIG. 3) for information and/or assets related to the linear Ad campaign or campaign associated with second screen content not necessarily related to the linear broadcast. In this regard, the paired second screen communication device 514 may go directly to the RAS 409 (FIG. 3) for information and/or assets related to the promotional offer for the product and/or service that may be the subject matter of the linear Ad campaign. The information may specify various options comprising, for example, presentation attributes, timing, frequency, length, expiration, and/or rules that may be applicable to the presentation of the promotional offer. The presentation attributes may specify various visual and/or audio characteristics of the promotional offer, which is to be presented on the paired second screen communication device 514. The timing may specify the times at which the promotional offer may be presented on the paired second screen communication device 514. The frequency may specify how often the promotional offer may be presented on the paired second screen communication device 514. The length may specify how long the promotional offer may be presented on the paired second screen communication device 514. The expiration may specify when the promotional offer expires. The rules may specify, for example, any policies and/or conventions that may be followed for presentation of the promotional offer on the paired second screen communication device 514.

For ACR events, the paired second screen communication device 514 may access the AdSS 411 (FIG. 3), which may provide a pointer, other indication and/or information to the assets for the promotional offer for the linear advertisement (Ad) campaign. For example, the information may specify the type of promotional offer that should be presented and any timing and/or other related information. The promotional offer may be selected from a pool of promotional offers and may be targeted based on, for example, viewer location, view preferences, demographics and so on. The paired second screen communication device 514 may utilize the provided pointer, other indication and/or information to request the assets for a promotional offer from the RAS 409 (FIG. 3). The RAS 409 (FIG. 3) may deliver the assets to the paired second screen communication device 514.

The advertisement logic application or module 514*a* on the paired second screen communication device 514 may be operable to control acquisition of the assets for presenting the promotional offer. In this regard, the advertisement logic application or module 514*a* may be operable to acquire the assets for regular advertisements from the reference advertisement server 409 (FIG. 3) and manage and control presentation of the promotional offer on the paired second screen communication device 514 based on various corresponding options. For ACR triggered advertisements or messages that comprise ACR triggered events, the advertisement logic application or module 514*a* may be operable to acquire information from the advertisement synchronization server 411 (FIG. 3) that specifies the assets that are to be utilized for the promotional offer. Once the advertisement logic application or module 514*a* acquires the information that specifies the assets that are to be utilized, the advertisement logic application or module 514*a* may utilize this information to acquire the corresponding assets from the reference advertisement server 409 (FIG. 3). The advertisement logic application or module 514*a* may be operable to manage and control presentation of the promotional offer on the paired second screen communication device 514. The advertisement logic application or module 514*a* may be operable to manage and/or control the steps 502, 504, 506 and 508. In this regard, for example, the advertisement logic application or module 514*a* may be operable to determine the identity of the linear Ad campaign and present a corresponding promotional offer and/or other information, which may be specified in the information acquired from the advertisement synchronization server 411 (FIG. 3).

Figure 5:
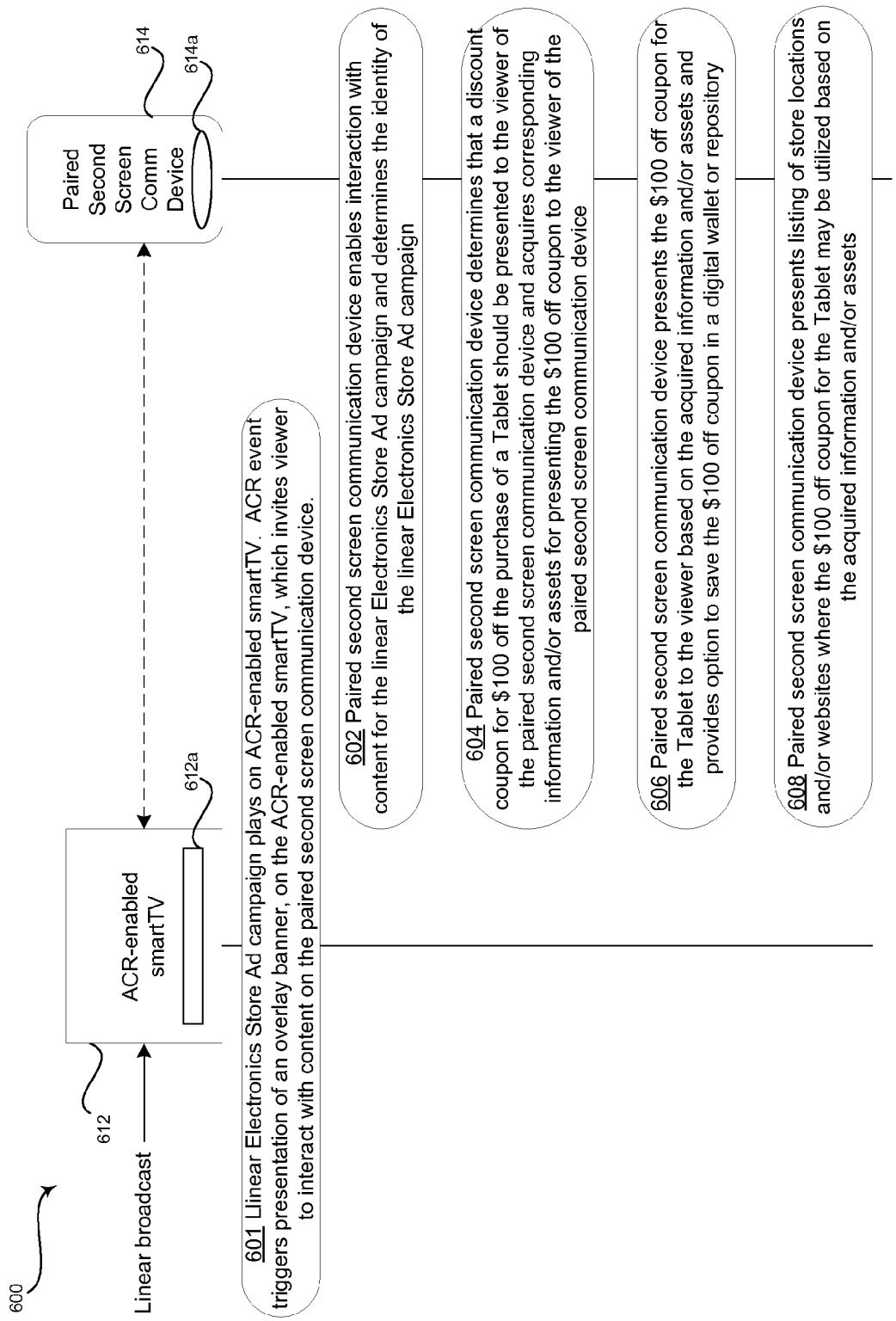
FIG. 5 is a flow diagram that illustrates exemplary handling of integrated coupon and digital wallet, in accordance with an exemplary embodiment of the invention.

FIG. 5 is a flow diagram that illustrates exemplary handling of integrated coupon and digital wallet, in accordance with an exemplary embodiment of the invention. Referring to FIG. 5, there is shown exemplary providing of product and service promotions 600. For the exemplary providing of product and service promotions 600, there is shown a ACR-enabled smartTV 612, a paired second screen communication device 614 and a plurality of steps 601 through 608.

The paired second screen communication device 614 may comprise an advertisement logic application or module 614*a*. The paired second screen communication device 614 may be substantially similar to the paired second screen communication device 514, which is illustrated and described with respect to, for example, FIG. 4. The advertisement logic application or module 614*a* may be substantially similar to the advertisement logic application or module 514*a*, which is illustrated and described with respect to, for example, FIG. 4. In some embodiments of the invention, the paired second screen communication device 614 may be operable to utilize audio automatic content recognition The ACR-enabled smartTV 612 is operable to receive a linear broadcast feed. The received linear broadcast feed may comprise a linear electronics store advertisement (Ad) campaign, for example, the linear advertisement (Ad) campaign. The linear electronics store advertisement (Ad) campaign may comprise an ACR triggered advertisement or a regular advertisement with no ACR (non-ACR) triggered events. Notwithstanding, the invention is not limited in this regard. Accordingly, in some embodiments of the invention, the linear electronics store advertisement (Ad) campaign may comprise some content, which may be ACR triggered and some content which may be non-ACR triggered.

In step 601, a linear electronic store advertisement (Ad) campaign plays on the ACR-enabled smartTV 612. An ACR event triggers presentation of an overlay banner, on the ACR-enabled smartTV 612, which invites a viewer of the ACR-enabled smartTV 612 to interact with content on the paired second screen communication device 614.

In step 602, the paired second screen communication device 614 enables interaction with content for the linear electronics store Ad campaign and determines the identity of the linear electronics store Ad campaign.

In step 604, the paired second screen communication device 614 determines that a coupon for $100 off the purchase of a tablet should be presented to the viewer of the paired second screen communication device 614 and acquires corresponding information and/or assets for presenting the $100 off coupon to the viewer of the paired second screen communication device 614.

In step 606, the paired second screen communication device 614 presents the $100 off coupon for the tablet to the viewer based on the acquired information and/or assets and provides an option to save the $100 off coupon in a digital wallet or repository.

In step 608, the paired second screen communication device 614 presents a listing of store locations and/or websites where the $100 off coupon for the tablet may be utilized based on the acquired information and/or assets.

For non-ACR events, the paired second screen communication device 614 may go directly to the RAS 409 (FIG. 3) for information and/or assets related to the linear electronics store Ad campaign. In this regard, the paired second screen communication device 614 may go directly to the RAS 409 (FIG. 3) for information and/or assets related to the $100 discount coupon for the tablet. The information may specify various options comprising, for example, presentation attributes, timing, frequency, length, expiration, and/or rules that may be applicable to the presentation of the $100 discount coupon for the tablet. The presentation attributes may specify various visual and/or audio characteristics of the promotional offer, which is to be presented on the paired second screen communication device 614. The timing may specify the times at which the $100 discount coupon for the tablet may be presented on the paired second screen communication device 614. The frequency may specify how often the $100 discount coupon for the tablet may be presented on the paired second screen communication device 614. The length may specify how long the $100 discount coupon for the tablet may be presented on the paired second screen communication device 614. The expiration may specify when the $100 discount coupon for the tablet expires. The rules may specify, for example, any policies and/or conventions that may be followed for presentation of the $100 discount coupon for the tablet on the paired second screen communication device 614.

For ACR events, the paired second screen communication device 614 may access the AdSS 411 (FIG. 3), which may provide a pointer, other indication and/or information to the assets for the $100 discount coupon for the tablet for the linear electronics store advertisement (Ad) campaign. For example, the information may specify the type of discount coupon and/or one or more products for which the discount coupon may be utilized and any timing and/or other related information. The $100 discount coupon for the tablet may be selected from a pool of promotional offers and may be targeted based on, for example, viewer location, view preferences, demographics and so on. The paired second screen communication device 614 may utilize the provided pointer, other indication and/or information to request the assets for a $100 discount coupon for the tablet from the RAS 409 (FIG. 3). The RAS 409 (FIG. 3) may deliver the assets to the paired second screen communication device 614. The location of the paired second screen communication device 614 may influence the assets that are delivered to the paired second screen communication device 614.

The advertisement logic application or module 614*a* on the paired second screen communication device 614 may be operable to control acquisition of the assets for presenting the $100 discount coupon for the tablet. In this regard, the advertisement logic application or module 614*a* may be operable to acquire the assets for regular advertisements from the reference advertisement server 409 (FIG. 3) and manage and control presentation of the $100 discount coupon for the tablet on the paired second screen communication device 614 based on various corresponding options. For ACR triggered advertisements or messages that comprise ACR triggered events, the advertisement logic application or module 614*a* may be operable to acquire information from the advertisement synchronization server 411 (FIG. 3) that specifies the assets that are to be utilized for the $100 discount coupon for the tablet. Once the advertisement logic application or module 514*a* acquires the information that specifies the assets that are to be utilized, the advertisement logic application or module 614*a* may utilize this information to acquire the corresponding assets from the reference advertisement server 409 (FIG. 3). The advertisement logic application or module 614*a* may be operable to manage and control various aspects of the presentation of $100 discount coupon for the tablet on the paired second screen communication device 614. In addition to providing a listing of stores and their corresponding location and the websites where the discount coupon may be utilized to purchase the tablet, the advertisement logic application or module 614*a* may also be operable to provide an option that may enable a viewer to make to purchase and apply the discount coupon. The advertisement logic application or module 614*a* may be operable to manage and/or control the steps 602, 604, 606 and 608.

Figure 6:
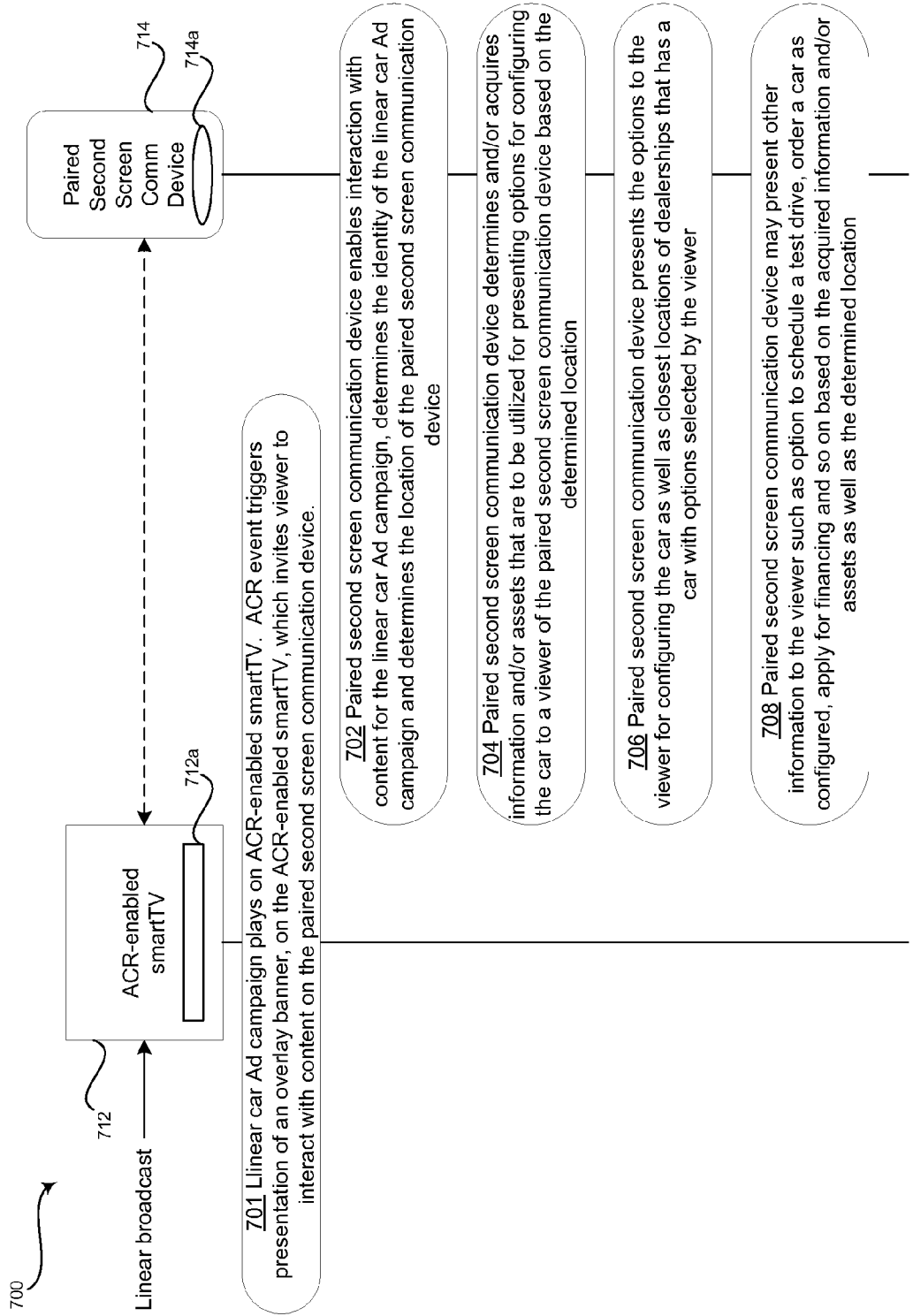
FIG. 6 is a flow diagram that illustrates exemplary providing of location based product and service promotions, in accordance with an exemplary embodiment of the invention.

FIG. 6 is a flow diagram that illustrates exemplary providing of location based product and service promotions, in accordance with an exemplary embodiment of the invention. Referring to FIG. 6, there is shown exemplary providing of location based product and service promotions 700. For the exemplary providing of location based product and service promotions 700, there is shown a ACR-enabled smartTV 712, a paired second screen communication device 714 and a plurality of steps 701 through 708. The exemplary steps 701 through 708 illustrate exemplary steps for providing location based product and service promotions for a car.

The paired second screen communication device 714 may comprise an advertisement logic application or module 714*a*. The paired second screen communication device 714 may be substantially similar to the paired second screen communication device 414, which is illustrated and described with respect to, for example, FIG. 3. The advertisement logic application or module 714*a* may be substantially similar to the advertisement logic application or module 414*a*, which is illustrated and described with respect to, for example, FIG. 3. In some embodiments of the invention, the paired second screen communication device 714 may be operable to utilize audio automatic content recognition.

The ACR-enabled smartTV 712 is operable to receive a linear broadcast feed. The received linear broadcast feed may comprise a linear advertisement (Ad) campaign, for example, the linear car advertisement (Ad) campaign. The linear car advertisement (Ad) campaign may comprise an ACR triggered advertisement or a regular advertisement with no ACR (non-ACR) triggered events. Notwithstanding, the invention is not limited in this regard. Accordingly, in some embodiments of the invention, the linear car advertisement (Ad) campaign may comprise some content, which may be ACR triggered and some content which may be non-ACR triggered.

In step 701, a linear car advertisement (Ad) campaign plays on the ACR-enabled smartTV 712. An ACR event triggers presentation of an overlay banner, on the ACR-enabled smartTV 712, which invites a viewer of the ACR-enabled smartTV 712 to interact with content on the paired second screen communication device 714.

In step 702, the paired second screen communication device 714 enables interaction with content for the linear car Ad campaign, determines the identity of the linear car Ad campaign and determines the location of the paired second screen communication device 714.

In step 704, the paired second screen communication device 714 determines and/or acquires information and/or assets that are to be utilized for presenting options for configuring the car to a viewer of the paired second screen communication device 714 based on the determined location of the paired second screen communication device 714.

In step 706, the paired second screen communication device 714 presents the options to the viewer for configuring the car as well as closest locations of dealerships that has a car with options selected by the viewer.

In step 708, the paired second screen communication device 714 may present other information to the viewer such as option to schedule a test drive, order a car as configured, apply for financing and so on based on the acquired information and/or assets as well as the determined location.

For non-ACR events, the paired second screen communication device 714 may go directly to the RAS 409 (FIG. 3) for information and/or assets related to the linear car Ad campaign. In this regard, the paired second screen communication device 714 may go directly to the RAS 409 (FIG. 3) for information and/or assets related to the car that is the subject matter of the linear car Ad campaign. The information may specify various options comprising, for example, presentation attributes, timing, frequency, length, expiration, and/or rules that may be applicable to the presentation of the promotional offer. The presentation attributes may specify various visual and/or audio characteristics of the promotional offer, which is to be presented on the paired second screen communication device 714. The timing may specify the times at which the car may be presented on the paired second screen communication device 714. The frequency may specify how often the car may be presented on the paired second screen communication device 714. The length may specify how long the car may be presented on the paired second screen communication device 714. The expiration may specify when an promotional offer for the car expires. The rules may specify, for example, any policies and/or conventions that may be followed for presentation of the car on the paired second screen communication device 714.

For ACR events, the paired second screen communication device 714 may access the AdSS 411 (FIG. 3), which may provide a pointer, other indication and/or information to the assets for the car presented in the linear car advertisement (Ad) campaign. For example, the information may specify the type of promotional offer that should be presented and any timing and/or other related information. The car may be selected from a pool of different models and/or trims. The paired second screen communication device 714 may utilize the provided pointer, other indication and/or information to request the assets for the car from the RAS 409 (FIG. 3). The RAS 409 (FIG. 3) may deliver the assets to the paired second screen communication device 714. The assets may enable the viewer to configure the car on the paired second screen communication device 714.

The advertisement logic application or module 714a on the paired second screen communication device 714 may be operable to control acquisition of the assets for presenting the car. In this regard, the advertisement logic application or module 714a may be operable to acquire the assets for regular advertisements from the reference advertisement server 409 (FIG. 3) and manage and control presentation of the car on the paired second screen communication device 714 based on various corresponding options. For ACR triggered advertisements or messages that comprise ACR triggered events, the advertisement logic application or module 714a may be operable to acquire information from the advertisement synchronization server 411 (FIG. 3) that specifies the assets that are to be utilized for presenting the car. Once the advertisement logic application or module 714a acquires the information that specifies the assets that are to be utilized, the advertisement logic application or module 714a may utilize this information to acquire the corresponding assets from the reference advertisement server 409 (FIG. 3). The advertisement logic application or module 714a may be operable to manage and control presentation of the car on the paired second screen communication device 714 so that the viewer may configure the car. The advertisement logic application or module 714a may be operable to manage and/or control the steps 702, 704, 706 and 708. In this regard, for example, the advertisement logic application or module 714a may be operable to determine the identity of the linear car Ad campaign and present options for configuring the car, promotional offers, options to schedule a test drive, order the car, apply for financing, and/or other information, which may be specified in the information acquired from the advertisement synchronization server 411 (FIG. 3) as well as the location information of the paired second screen communication device 714.

The advertisement logic application or module 714a on the paired second screen communication device 714 may be operable to determine the location of the paired second screen communication device 714 and based on that determined location, the viewer of the second screen device may be presented with a listing of the closest car dealerships that may be selling the car. The location of the paired second screen communication device 714 may be communicated to a reference ad server (RAS) 409 and/or ad synchronization server (AdSS) 411. The RAS 409 may determine the content that should be communicated to the paired second screen communication device 714 based on the determined location.

If the viewer of the paired second screen communication device 714 selects one of the car dealerships, the advertisement logic application or module 714a on the paired second screen communication device 714 may be operable to give the viewer the capability to schedule a test drive, send the options for the configured car to the dealership and/or send personal information for the viewer to the dealership. The personal information may be utilized to determine eligibility to purchase the car or get a loan.

In accordance with an exemplary embodiment of the invention, the second screen device may be paired with the ACR-enabled smartTV 712, which may be located at a home. A home viewer may be watching the ACR-enabled smartTV 712 at the home. The paired second screen communication device 714 may be located, for example, at a mall, where it is being viewed by a mobile viewer. Since the second screen communication device 714 is paired with the ACR-enabled smartTV 712, which is located at the home, the paired second screen communication device 714 is operable to interact with content that is being displayed on the ACR-enabled smartTV 712. The position of the paired second screen communication device 714 may be determined utilizing, for example, a global navigational satellite system (GNNS) receiver, for example, GPS, Galileo and/or Glonass receiver, which may be coupled to or integrated within the paired second screen communication device 714.

In accordance with an exemplary embodiment of the invention, the location of the paired second screen communication device 714 may be communicated to an RAS 409 (FIG. 3) and/or the AdSS 411 (FIG. 3). The RAS 409 (FIG. 3) and/or the AdSS 411 (FIG. 3) may be operable to control the content that may be communicated to the paired second screen communication device 714 and/or how interaction may occur on the paired second screen communication device 714. For example, if the location of the paired second screen communication device 714 is close to a dealership that has the car as configured in stock, the mobile viewer may be notified that the car dealership is x miles (e.g. x is 2 miles) away and the mobile viewer may be given an option to schedule a test drive at that car dealership. Based on information from the RAS 409 (FIG. 3) and/or the AdSS 411 (FIG. 3), the advertisement logic application or module 714a on the paired second screen communication device 714 may be operable to provide the mobile viewer with directions to and/or contact information for that car dealership. In instances where the location of the paired second screen communication device 714 may not be close enough to a car dealership that has the car as configured, the mobile viewer may not be given an option to schedule a test drive or may be given the location of a car dealership that may be near the home of mobile viewer or the home viewer. Accordingly, based on the location of the paired second screen communication device 714, certain features and/or options may or may not be provided to a viewer of the paired second screen communication device 714.

In instances where a plurality of paired second screen communication devices are paired with the ACR-enabled smartTV 712, different ones of the plurality of paired second screen communication devices may be provided with different options and/or features based on the corresponding location of each of the plurality of paired second screen devices. For example, if a second paired second screen communication device is located near a second car dealership that has the car as configured, then that second paired second screen communication device will be provided with information pertaining to the second car dealership. If a third paired second screen communication device is located near a third car dealership that has the car as configured, and the second car dealership is far away from the third car dealership, then that third paired second screen communication device will be provided with information pertaining to the third car dealership and not the information related to the second car dealership. Accordingly, for different offers, promotions, options and/or choices may be provided to the each of the paired second screen communication device, the second paired second screen communication device, and/or the third paired second screen communication device based on their corresponding determined locations.

Each of the plurality of paired second screen communication devices may be provided with an option to enable and/or disable communication and/or sharing of their location information to, for example, the ACR-enabled smartTV 712, the RAS 409 (FIG. 3) and/or the AdSS 411 (FIG. 3). In this regard, each of the plurality of paired second screen communication devices may be provided with an option, which may enable the corresponding viewer to enable and/or disable the use of their corresponding location information.

In various exemplary embodiments of the invention, an ACR-enabled display communication device such as the ACR-enabled smartTV 412 may display a linear advertisement campaign. A second screen communication device such as the paired second screen communication device 414, which may be paired with the ACR-enabled display communication device 412, may be operable to detect when content associated with a linear advertisement campaign is available for display on the second screen communication device 414. A location of the second screen communication device 414 may be determined when the second screen communication device 414 detects that the content associated with the linear advertisement campaign is available for display. The second screen communication device 414 may be operable to customize content for presentation on the second screen communication device 414 in order to offer one or more products and/or services to the viewer of the second screen communication device 414 based on the determined location.

The second screen communication device 414 may be operable to determine assets that may be required and/or utilized for the customization of the content so that it may be presented on the second screen communication device 414. The second screen communication device 414 may be operable to acquire the determined assets from one or more servers such as the RAS 409 (FIG. 3) and/or the AdSS 411 (FIG. 3). The second screen communication device 414 may be operable to control presentation of the content based on information corresponding to the acquired assets. The second screen communication device 414 may be operable to generate additional content for presentation on the second screen communication device 414 based on the acquired assets and/or information acquired from the one or more servers such as the RAS 409 (FIG. 3) and/or the AdSS 411 (FIG. 3).

The second screen communication device 414 may also be operable to store promotional content associated with the generated additional content in a digital repository, for example, as a digital wallet, which may be associated with the second screen communication device 414 and/or the viewer of the second screen communication device 414. In an exemplary embodiment of the invention, the promotional content may comprise a coupon and/or special offer. In this regard, for example a discount coupon for a tablet may be stored in an electronic wallet for the viewer. The generated additional content may comprise one or more addresses of websites and/or places where the coupon and/or the special offer may be redeemed or otherwise utilized. In this regard, for example, one or more uniform resource locations (URLs) or links to online stores, which accept the discount coupon may be presented to the viewer.

In accordance with an embodiment of the invention, the generated additional content may comprise one or more options that enables a viewer of the second screen communication device 414 to configure the one or more products and/or services based on personal preferences of the viewer. The generated additional content may comprise one or more options that enables the viewer of the second screen communication device 414 to purchase and/or request additional information on the one or more products and/or services. For example, options for selecting a car model and for configuring the color, trim and/or accessories of the car may be provided to the viewer of the second screen communication device 414. Based on the location of the paired second screen communication device 414, information that may be specific to the location of the viewer and the paired second screen communication device 414 may be acquired from the RAS 409 (FIG. 3) and/or AdSS 411 (FIG. 3) and presented to the viewer. For example, if the determined location may be in the state of California, then options for the car that may be specific to the state of California may be presented to the viewer. In this regard, the viewer may select options that may ensure that the car may be compliant for use in the State of California. Once the viewer has completed selecting and configuring the options for the car, the viewer may be presented with an option to schedule a test drive at a dealership location that may be closest to the location of the viewer. The viewer may also be presented with an option to purchase the car at a location that may be closed to the location of the viewer.

In accordance with some embodiments of the invention, preferences of the viewer and/or capabilities of the paired second screen communication device 414 may influence the options for one or more products and/or services that are presented to the viewer of the second screen communication device 414.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the invention may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for providing of product and service discounts, and location based services in an automatic content recognition based system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
in a second screen communication device that is paired with an automatic content recognition enabled display communication device that presents a linear advertisement campaign, wherein said automatic content recognition enabled display communication device receives a linear feed and a corresponding IP-based feed, and said IP-based feed is generated from said linear feed, and said automatic content recognition enabled display communication device communicates with an ACR system that assigns same interactive event identifiers to different sets of video and audio fingerprints that are generated from same video content by different video fingerprint technologies from multiple vendors based on timing of assignment of the interactive event identifiers, and the interactive event identifiers are utilized to trigger one or more interactive events:
   detecting when content associated with said linear advertisement campaign is available for display on said second screen communication device based on said triggered one or more interactive events;
   determining a location of said second screen communication device based on said detecting; and
   customizing content for presentation on said second screen communication device to offer one or more products and/or services based on said determined location.

2. The method according to claim 1, comprising determining assets required for said customization of said content for said presentation on said second screen communication device.

3. The method according to claim 2, comprising acquiring said determined assets from one or more servers, wherein:
   assets for non-automatic content recognition events are acquired from a first server; and
   assets for automatic content recognition events are acquired from a second server that is different from said first server.

4. The method according to claim 3, comprising controlling presentation of said content based on information corresponding to said acquired assets.

5. The method according to claim 3, comprising generating additional content for said presentation on said second screen communication device based on said acquired assets and/or information acquired from said one or more servers.

6. The method according to claim 5, comprising storing promotional content associated with said generated additional content in a digital repository associated with said second screen communication device.

7. The method according to claim 5, wherein said generated additional content comprises one or more options that enables a viewer of said second screen communication device to configure said one or more products and/or services based on personal preferences.

8. The method according to claim 6, wherein said promotional content comprises a coupon and/or special offer.

9. The method according to claim 7, wherein said generated additional content comprises one or more options that enables said viewer of said second screen communication device to purchase and/or request additional information on said one or more products and/or services.

10. The method according to claim 8, wherein said generated additional content comprises one or more addresses of websites and/or places where said coupon and/or special offer may be utilized.

11. A system, comprising:
a second screen communication device that is paired with an automatic content recognition enabled display communication device that presents a linear advertisement campaign, wherein said automatic content recognition enabled display communication device receives a linear feed and a corresponding IP-based feed, and said IP-based feed is generated from said linear feed, and said automatic content recognition enabled display communication device communicates with an ACR system that assigns same interactive event identifiers to different sets of video and audio fingerprints that are generated from same video content by different video fingerprint technologies from multiple vendors based on timing of assignment of the interactive event identifiers, and the interactive event identifiers are utilized to trigger one or more interactive events, said second screen communication device being operable to:
  detect when content associated with said linear advertisement campaign is available for display on said second screen communication device based on said triggered one or more interactive events;
  determine a location of said second screen communication device based on said detecting; and
  customize content for presentation on said second screen communication device to offer one or more products and/or services based on said determined location.

12. The system according to claim 11, wherein said second screen communication device is operable to determine assets required for said customization of said content for said presentation on said second screen communication device.

13. The system according to claim 12, wherein said second screen communication device is operable to acquire said determined assets from one or more servers, wherein:
  assets for non-automatic content recognition events are acquired from a first server; and
  assets for automatic content recognition events are acquired from a second server that is different from the first server.

14. The system according to claim 13, wherein said second screen communication device is operable to control presentation of said content based on information corresponding to said acquired assets.

15. The system according to claim 13, wherein said second screen communication device is operable to generate additional content for said presentation on said second screen communication device based on said acquired assets and/or information acquired from said one or more servers.

16. The system according to claim 13, wherein:
  said generated additional content comprises one or more options that enables a viewer of said second screen communication device to configure said one or more products and/or services based on personal preferences; and
  said generated additional content comprises one or more options that enables said viewer of said second screen communication device to purchase and/or request additional information on said one or more products and/or services.

17. The system according to claim 15, wherein said second screen communication device is operable to store promotional content associated with said generated additional content in a digital repository associated with said second screen communication device.

18. The system according to claim 17, wherein said promotional content comprises a coupon and/or special offer.

19. The system according to claim 18, wherein said generated additional content comprises one or more addresses of websites and/or places where said coupon and/or special offer may be utilized.

20. A non-transitory computer readable medium having stored thereon, a computer program having at least one code section being executable by a machine for causing the machine to perform steps comprising:
  in a second screen communication device that is paired with an automatic content recognition enabled display communication device that presents a linear advertisement campaign, wherein said automatic content recognition enabled display communication device receives a linear feed and a corresponding IP-based feed, and said IP-based feed is generated from said linear feed, and said automatic content recognition enabled display communication device communicates with an ACR system that assigns same interactive event identifiers to different sets of video and audio fingerprints that are generated from same video content by different video fingerprint technologies from multiple vendors based on timing of assignment of the interactive event identifiers, and the interactive event identifiers are utilized to trigger one or more interactive events:
    detecting when content associated with said linear advertisement campaign is available for display on said second screen communication device based on said triggered one or more interactive events;
    determining a location of said second screen communication device based on said detecting; and
    customizing content for presentation on said second screen communication device to offer one or more products and/or services based on said determined location.

21. The non-transitory computer readable medium according to claim 20, comprising determining assets required for said customization of said content for said presentation on said second screen communication device.

22. The non-transitory computer readable medium according to claim 21, comprising acquiring said determined assets from one or more servers, wherein:
  assets for non-automatic content recognition events are acquired from a first server; and
  assets for automatic content recognition events are acquired from a second server that is different from the first server.

23. The non-transitory computer readable medium according to claim 22, comprising controlling presentation of said content based on information corresponding to said acquired assets.

24. The non-transitory computer readable medium according to claim 22, comprising generating additional content for said presentation on said second screen communication device based on said acquired assets and/or information acquired from said one or more servers.

25. The non-transitory computer readable medium according to claim 24, comprising storing promotional content associated with said generated additional content in a digital repository associated with said second screen communication device.

26. The non-transitory computer readable medium according to claim 24, wherein said generated additional content comprises one or more options that enables a viewer of said second screen communication device to configure said one or more products and/or services based on personal preferences.

27. The non-transitory computer readable medium according to claim 25, wherein said promotional content comprises a coupon and/or special offer.

28. The non-transitory computer readable medium according to claim 26, wherein said generated additional content comprises one or more options that enables said viewer of said second screen communication device to purchase and/or request additional information on said one or more products and/or services.

29. The non-transitory computer readable medium according to claim 27, wherein said generated additional content comprises one or more addresses of websites and/or places where said coupon and/or special offer may be utilized.

30. A system, comprising:
a second screen communication device that is paired with an automatic content recognition enabled display communication device that presents a linear advertisement campaign, wherein:
said automatic content recognition enabled display communication device communicates with an ACR system that assigns same interactive event identifiers to different sets of video and audio fingerprints that are generated from same video content by different video fingerprint technologies from multiple vendors based on timing of assignment of the interactive event identifiers, and
the interactive event identifiers are utilized to trigger one or more interactive events;
said second screen communication device being operable to:
detect when content associated with said linear advertisement campaign is available for display on said second screen communication device based on said triggered one or more interactive events;
determine a location of said second screen communication device based on said detecting; and
customize content for presentation on said second screen communication device to offer one or more products and/or services based on said determined location.

* * * * *